United States Patent
Nishimura et al.

(10) Patent No.: US 10,321,038 B2
(45) Date of Patent: Jun. 11, 2019

(54) IMAGING APPARATUS AND IMAGE RECORDING METHOD HAVING MODES TO STORE POSITION INFORMATION FOR IMAGE DATA

(71) Applicant: Maxell, Ltd., Kyoto (JP)

(72) Inventors: Ryuji Nishimura, Osaka (JP); Motoyuki Suzuki, Osaka (JP); Yasunobu Hashimoto, Osaka (JP); Nobuo Masuoka, Osaka (JP); Hiroshi Shimizu, Osaka (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/562,524

(22) PCT Filed: Dec. 22, 2015

(86) PCT No.: PCT/JP2015/085818
§ 371 (c)(1),
(2) Date: Sep. 28, 2017

(87) PCT Pub. No.: WO2016/157649
PCT Pub. Date: Oct. 6, 2016

(65) Prior Publication Data
US 2018/0097980 A1 Apr. 5, 2018

(30) Foreign Application Priority Data
Apr. 1, 2015 (WO) .................. PCT/JP2015/060395

(51) Int. Cl.
*H04N 5/374* (2011.01)
*H04N 5/232* (2006.01)
(Continued)

(52) U.S. Cl.
CPC ............. *H04N 5/232* (2013.01); *G01S 19/01* (2013.01); *G06F 3/167* (2013.01); *H04N 1/00* (2013.01);
(Continued)

(58) Field of Classification Search
CPC ...... H04N 5/232; H04N 9/8205; H04N 5/772; H04N 5/23241; H04N 1/00; H04W 4/025; H04W 4/04; G06F 3/167; G01S 19/01
See application file for complete search history.

(56) References Cited

U.S. PATENT DOCUMENTS

2008/0118100 A1 5/2008 Hayashi
2010/0053371 A1 3/2010 Karimoto
(Continued)

FOREIGN PATENT DOCUMENTS

JP 2003-018506 A 1/2003
JP 2004-194174 A 7/2004
(Continued)

OTHER PUBLICATIONS

International Search Report of PCT/JP2015/085818 dated Mar. 29, 2016.

*Primary Examiner* — Padma Haliyur
(74) *Attorney, Agent, or Firm* — Mattingly & Malur, PC

(57) ABSTRACT

An imaging apparatus 1 includes: a GPS receiver unit 115 for acquiring GPS signals; a position information acquisition unit 1022 for acquiring position information corresponding to a position where the image data acquired from the GPS signals received by the GPS receiver unit 115 is acquired; a recording medium 106 for storing the image data and metadata; and an image recording unit 1024 for recording, in the recording medium 106, the image data stored in the RAM 103 and the metadata. If the GPS signals cannot
(Continued)

be acquired, the position information acquisition unit 1022 performs a position information acquisition processing for acquiring position information within a preset time. When the position information acquisition unit 1022 acquires the position information, the image recording unit 1024 records, in the recording medium 106, the image data stored in the RAM 103 and the metadata to which the acquired position information is added.

16 Claims, 24 Drawing Sheets

(51) Int. Cl.
*G01S 19/01* (2010.01)
*G06F 3/16* (2006.01)
*H04W 4/04* (2009.01)
*H04N 1/00* (2006.01)
*H04N 5/77* (2006.01)
*H04N 9/82* (2006.01)
*H04W 4/02* (2018.01)

(52) U.S. Cl.
CPC ......... *H04N 5/23241* (2013.01); *H04N 5/772* (2013.01); *H04N 9/8205* (2013.01); *H04W 4/025* (2013.01); *H04W 4/04* (2013.01)

(56) References Cited

U.S. PATENT DOCUMENTS

2011/0254978 A1 10/2011 Yamaji
2012/0308081 A1 12/2012 Sato

FOREIGN PATENT DOCUMENTS

| | | |
|---|---|---|
| JP | 2008-131311 | 6/2008 |
| JP | 2008-306464 A | 12/2008 |
| JP | 2009-060340 A | 3/2009 |
| JP | 2010-057057 A | 3/2010 |
| JP | 2013-013070 A | 1/2013 |

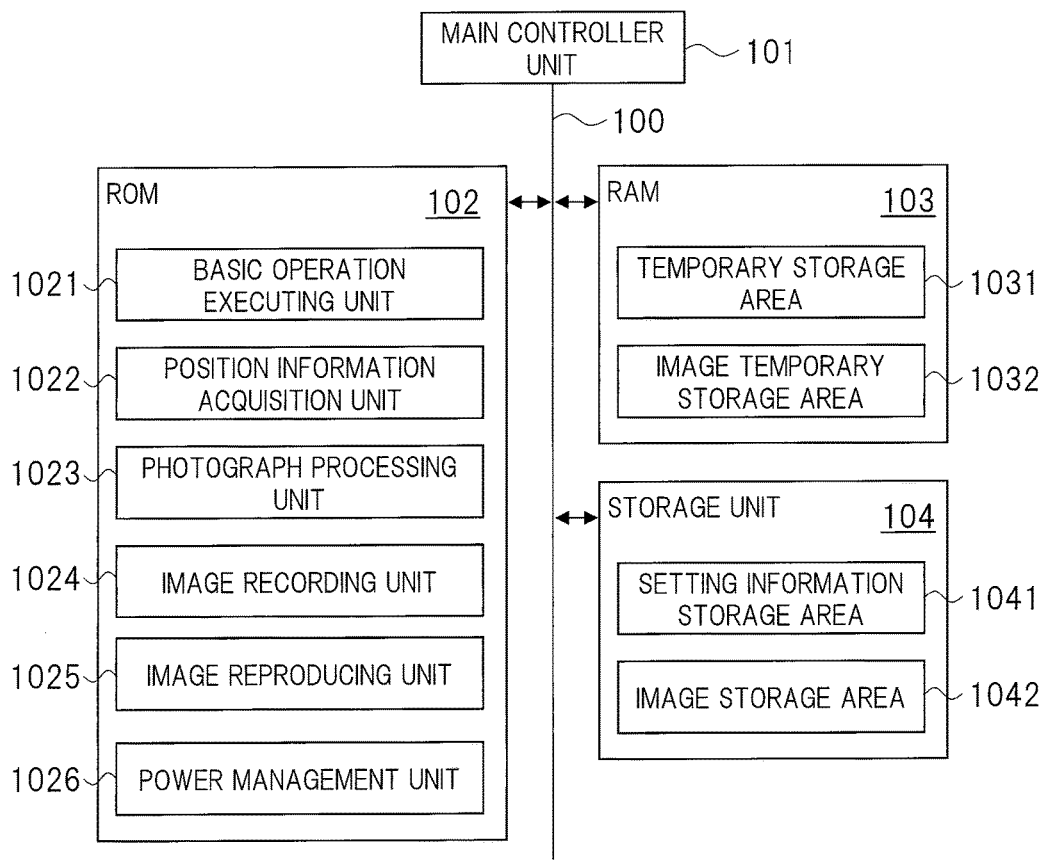
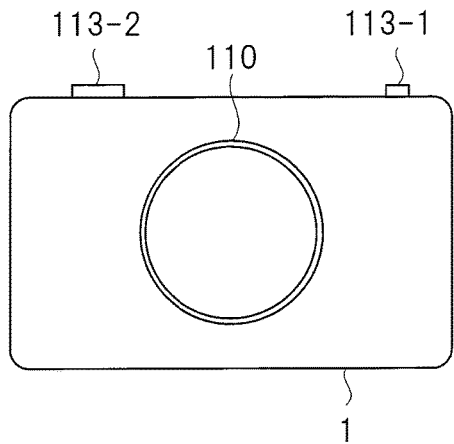
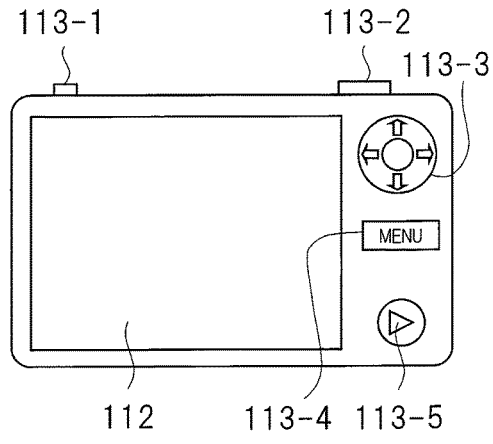

FIG. 12
(a)
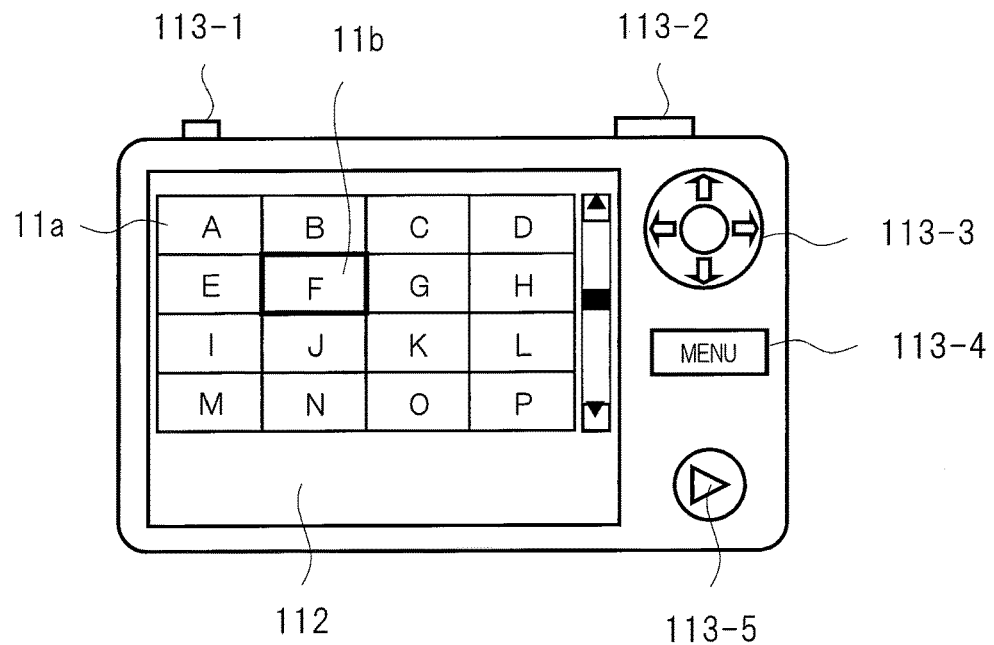
(b)
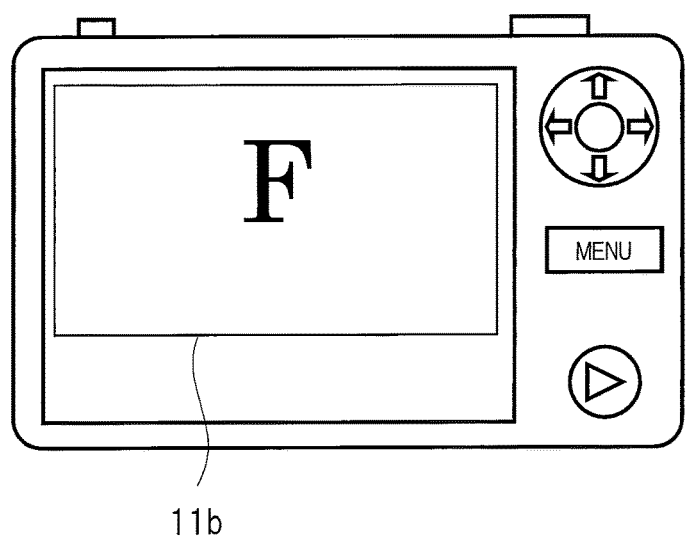

IMAGING APPARATUS AND IMAGE RECORDING METHOD HAVING MODES TO STORE POSITION INFORMATION FOR IMAGE DATA

TECHNICAL FIELD

The present invention relates to an imaging apparatus and an image recording method, and more particularly to an effective technique for acquiring position information on a photographed image.

BACKGROUND ART

Commercialized have been a large number of imaging apparatuses such as digital cameras: capable of recording image data of a captured still image or moving image in a randomly accessible recording medium such as an hard disk drive (HDD), an optical disc, or a memory card; and capable of reproducing the image data on a personal computer, a television receiving apparatus, or the like.

In these imaging apparatuses, metadata such as photographing date and time and photographing location (accompanying information) is added to the image data at a time of photographing to be recorded. Thus, it is possible to easily retrieve and reproduce desired image data from the recording medium based on the metadata.

For example, Patent Document 1 proposes a system for acquiring position information based on a global positioning system (GPS) to record associated with image data.

In addition, as an image format standard for adding information such as photographing location to still image data and for recoding it, for example, "Image File Format Standard for Digital Still Camera Exif 2.3 (hereinafter referred to as "EXIF Standard")" revised by the Electronics Standard Information Industries Association in December 2012 is known.

RELATED ART DOCUMENTS

Patent Documents

Patent Document 1: Japanese Patent Application Laid-open No. 2003-18506

SUMMARY OF THE INVENTION

Problems to be Solved by the Invention

In the above-described technique of acquiring the position information with GPS, it is necessary to receive radio waves from at least three GPS satellites. When a power supply of the imaging apparatus is turned off, the radio waves from the GPS satellites are naturally not received. In that case, since the radio waves from the GPS satellites are received after the power supply of the imaging apparatus is turned on, it may take several minutes to determine the position information.

Therefore, for example, when a user photographs a still image, there has been a problem as follows. When the position information by GPS is not determined by the time the user presses a shutter after the power supply of the imaging apparatus is turned on, the position information cannot be recorded, or the position information acquired in the past is recorded.

An object of the present invention is to provide a technique for being capable of a reduction in generation of image data that has erroneous position information or in which position information is not added.

The above and other objects and novel characteristics of the present invention will be apparent from the description of the present specification and the accompanying drawings.

Means for Solving the Problems

The following is a brief description of an outline of the typical invention disclosed in the present application.

That is, a typical imaging apparatus includes an imaging processing unit, a first memory, a signal receiver unit, a position information acquisition unit, a second memory, and an image recording unit. The imaging processing unit acquires image data from an optical image.

The first memory temporarily stores the image data. The signal receiver unit acquires a position calculation signal. The position information acquisition unit acquires position information corresponding to a position where the image data is acquired from the position calculation signal received by the signal receiver unit. The second memory stores the image data and metadata. The image recording unit records, in the second memory, the image data stored in the first memory and the metadata.

Then, when the signal receiver unit cannot acquire the position calculation signal, the position information acquisition unit performs a position information acquisition processing for acquiring position information within a preset time. In addition, when the position information acquisition unit acquires position information, the image recording unit records, in the second memory, the temporarily stored image data and the metadata to which the acquired position information is added.

In particular, the position calculation signal received by the signal receiver unit is a GPS signal, and the position information acquisition unit calculates the position information from the GPS signals. Furthermore, when the signal receiver cannot receive the GPS signal even after a lapse of a preset time, the image recording unit records, in the second memory, temporarily stored image data and metadata that does not include the position information.

Effects of the Invention

The effects obtained by typical embodiments of the invention disclosed in the present application will be briefly described below.

(1) Generation of image data that has erroneous position information or in which position information is not acquired can be reduced.

(2) An additional value of the imaging apparatus can be enhanced by the above (1).

BRIEF DESCRIPTIONS OF THE DRAWINGS

FIG. 2 is an explanatory diagram showing an example of a configuration about software stored in a ROM, a RAM, and a storage unit included in the imaging apparatus 1 of FIG. 1;

FIG. 3 is an explanatory diagram showing an example of an appearance of the imaging apparatus of FIG. 1;

FIG. 12 is an explanatory diagram showing a display example of a display screen displayed on the display unit included in the imaging apparatus of FIG. 1 in an image recording processing of FIG. 11;

DETAILED DESCRIPTION OF PREFERRED EMBODIMENTS

Figure 1:
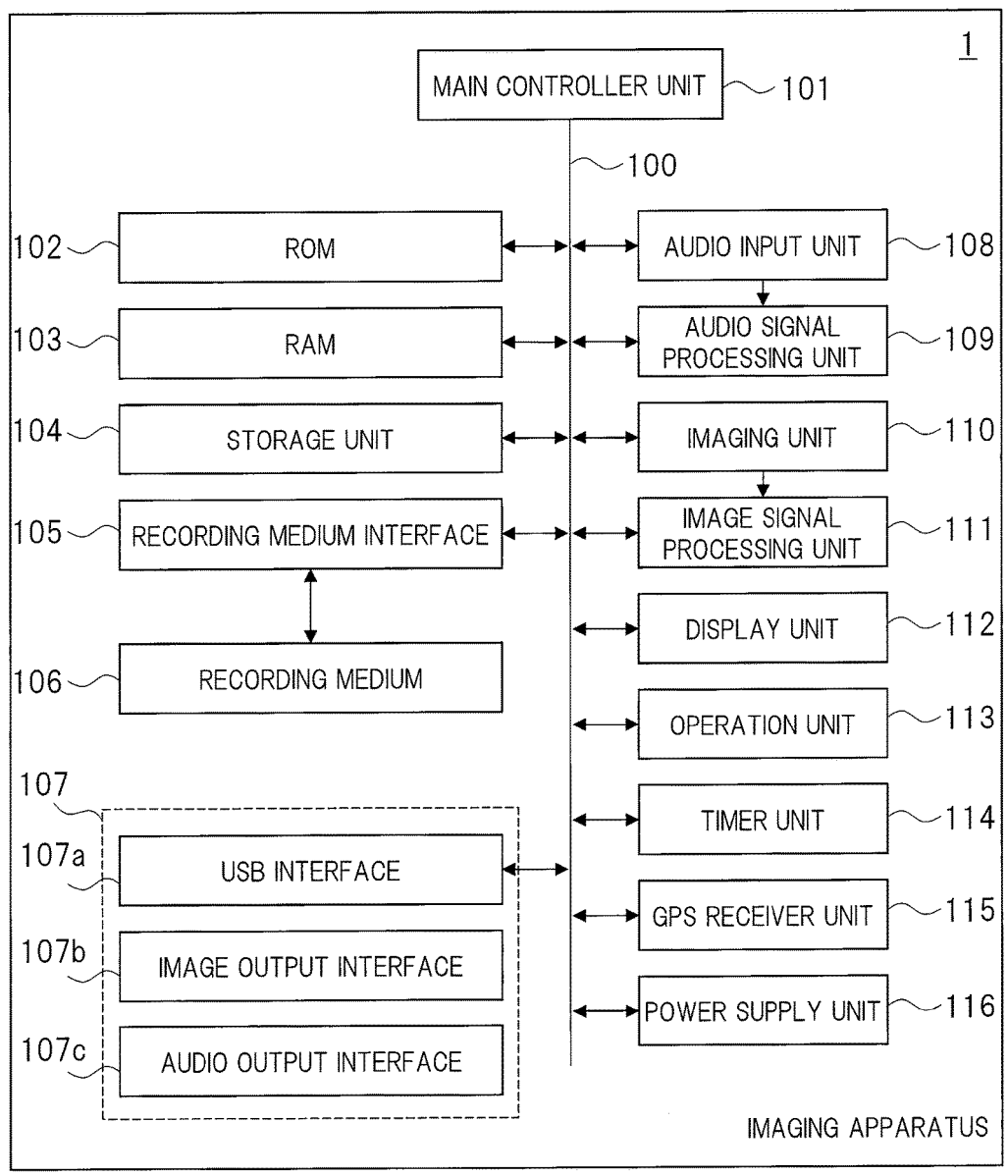
FIG. 1 is a block diagram showing an example of a configuration about an imaging apparatus according to the present first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference characters throughout the drawings for describing the embodiments, and the repetitive description thereof is omitted.

Hereinafter, the present embodiment will be described in detail.

(First Embodiment)

<Configuration Example of Imaging Apparatus>

FIG. 1 is a block diagram showing an example of a configuration about an imaging apparatus 1 according to the present first embodiment.

The imaging apparatus 1 includes, for example, a digital camera. The imaging apparatus 1 includes a main controller unit 101, a ROM 102, a RAM 103, a storage unit 104, a recording medium interface 105, a recording medium 106, an external interface 107, an audio input unit 108, an audio signal processing unit 109, an imaging unit 110, an image signal processing unit 111, a display unit 112, an operation unit 113, a timer unit 114, a GPS receiver unit 115, and a power supply unit 116.

The above-described main controller unit 101 and other functional blocks are mutually connected through a system bus 100. The system bus 100 is a data communication path for transmitting and receiving data between the main controller unit 101 and the other functional blocks.

The main controller unit 101 is, for example, a central processing unit (CPU) or the like, and controls the entire imaging apparatus 1 according to various kinds of operation programs and data stored in the read only memory (ROM) 102 or the random access memory (RAM) 103.

The ROM 102 is a memory in which various kinds of programs for controlling the imaging apparatus 1 are stored, and a rewritable ROM such as an electrically erasable programmable ROM (EEPROM) or a flash ROM is used.

The RAM 103 includes a volatile memory, and is used as a temporary storage area at a time of executing a program stored in the ROM 102 or as a temporary storage of a photographed image.

The storage unit 104 stores information such as operation set values of the imaging apparatus 1 and image data, and a nonvolatile rewritable device such as a flash ROM or a solid state drive (SSD) is used.

The ROM 102 and the RAM 103 may be formed integrally with the main controller unit 101. In addition, the ROM 102 may use a partial storage area in the storage unit 104 without being independently formed as shown in FIG. 1.

The recording medium interface 105 is an interface for recording and reading information such as image data in the recording medium 106 such as an SD card capable of being accommodated and taken out in and from the imaging apparatus 1.

The external interface 107 is an interface group for extending functions of the imaging apparatus 1. Here, the external interface 107 includes a universal serial bus (USB) interface 107a, an image output interface 107b, and an audio output interface 107c.

The USB interface 107a is connected to a USB interface of an external apparatus such as a personal computer or a television receiving apparatus, and enables the external apparatus to read and display etc. the image data and the like stored in the storage unit 104 or the recording medium 106.

The image output interface 107b and the audio output interface 107c output image/audio signals to an external image/audio output apparatus. Here, the image output interface 107b and the audio output interface 107c may output image and audio together by using a high-definition multimedia interface (HDMI: registered trademark).

The audio input unit 108 includes: a microphone for converting a sound around the imaging apparatus 1 into an electric signal; an analog/digital (A/D) converter for converting, into audio data of a digital signal, the sound converted into the electric signal; and the like.

The audio signal processing unit 109 performs, on the audio data inputted from the audio input unit, a filter processing, a processing for converting the audio data according to the format of the moving image to be recorded in the recording medium 106, and the like.

The imaging unit 110 serving as an imaging processing unit is configured by devices etc. of: an optical system including a lens for zooming and focusing operations; a mechanism system; an image sensor; and an electric system. The mechanism system drives the lens for zooming and focusing operations.

The image sensor includes: a charge coupled device (CCD) image sensor, a complementary metal oxide semiconductor (CMOS) image sensor, or the like. These image sensors convert, into an electric signal, an optical image inputted from the lens. The electric system includes an A/D converter for converting, into image data of a digital signal, an image converted into an electric signal by an image sensor.

The image signal processing unit 111 performs an image processing such as white balance adjustment, exposure adjustment, and gamma correction on the image data inputted from the imaging unit 110. In addition, the image signal processing unit 111 performs a conversion processing on the image data according to the format recorded in the recording medium 106.

For example, in a case of moving images, the image signal processing unit 111 converts the moving images into image data such as moving picture experts group phase 2 (MPEG2) or H.264, and in a case of a still image, the image signal processing unit 111 converts the still image into image data such as joint photographic experts group (JPEG) or tagged image file format (TIFF).

The display unit 112 displays: an image captured by the image sensor included in the imaging unit 110; image data recorded in the storage unit 104 or the recording medium 106; a screen for making various kinds of settings of the imaging apparatus; or the like.

The operation unit 113 is an instruction input unit for inputting operation instructions to the imaging apparatus 1, and includes a power on/off button, a shutter button, buttons for making various kinds of settings, and the like of the imaging apparatus 1.

In addition, a touch panel may be provided on a surface of the display unit 112, and an operation input may be performed by detecting a position of a button or the like displayed on the display unit 112 and a position where the touch panel is touched.

The timer unit 114 uses a real time clock (RTC) circuit to measure, for example, an elapsed time from the date and time set by a user(s), and outputs the date and time information. Based on date and time information acquired from the timer unit 114, the date and time information is added to and recorded in the image data.

The GPS receiver unit 115 serving as a signal receiver unit receives radio waves from a plurality of GPS satellites, and can acquire information on a position (latitude, longitude, and the like) of the imaging apparatus 1 based on the received GPS signals.

The power supply unit 116 includes a battery not shown, and supplies power to each block constituting the imaging apparatus 1 depending on various kinds of states such as a power-on state, a power-off state, and a power-off standby state in response to the instructions from the main controller unit 101.

It should be noted that, in the present embodiment, the digital camera is shown as an example of the imaging apparatus, but the imaging apparatus is not limited to a digital camera, and can be used in various forms such as terminals each having a camera function such as a tablet and a smartphone.

<Software Configuration of Imaging Apparatus>

FIG. 2 is an explanatory diagram showing an example of a configuration about software stored in each of the ROM 102, the RAM 103, and the storage unit 104 that are included in the imaging apparatus 1 of FIG. 1.

As shown in FIG. 2, a program stored in the ROM 102 includes a processing for each function of a basic operation executing unit 1021, a position information acquisition unit 1022, a photograph processing unit 1023, an image recording unit 1024, an image reproducing unit 1025, and a power management unit 1026. The main controller unit 101 executes the program for processing each function stored in the ROM 102.

It should be noted that each function and the like of the program stored in the ROM 102 may be partially or entirely implemented by hardware such as an integrated circuit. Alternatively, hardware and software may be used in combination.

In addition, the RAM 103 includes a temporary storage area 1031 and an image temporary storage area 1032 as storage areas. When the program stored in the ROM 102 is executed, the temporary storage area 1031 temporarily holds data as the need arises. The image temporary storage area 1032 temporarily stores the image photographed in the image processing unit 1023.

In the storage unit 104, information that is set in executing the program stored in the ROM 102 is stored. In addition, the storage unit 104 includes an image storage area 1042 for storing still image data and moving image data photographed in the imaging apparatus 1.

It should be noted that, for simplicity of explanation in the following description, the description will be given by assuming that the main controller unit 101 executes the program stored in the ROM 102 to control each operation block.

By the program in the ROM 102, the basic operation executing unit 1021 controls various kinds of settings and the overall operations of the imaging apparatus 1. The position information acquisition unit 1022 performs a processing for acquiring position information such as the latitude and the longitude of the imaging apparatus 1 based on the GPS signals from the GPS satellites received by the GPS receiver unit 115.

The photograph processing unit 1023 performs a processing for taking the image data imaged by the imaging unit 110 into the image temporary storage area 1032 of the RAM 103 when the user presses the shutter button included in the operation unit 113.

The image recording unit 1024 performs a processing for recording, in the storage unit 104, the image data imported into the image temporary storage area 1032, or a processing for recording the image data in the recording medium 106 through the recording medium interface 105.

The image reproducing unit 1025 performs a processing for reading the image data recorded in the storage unit 104 or the recording medium 106 to display it on the display unit 112. The power management unit 1026 performs a processing for controlling the power supply that supplies power to each block constituting the imaging apparatus 1 with the power button included in the operation unit 113.

The program stored in the ROM 102 may be stored in advance at a time of product shipment. Alternatively, a program acquired from a server device and the like on the Internet by a personal computer may be stored through the USB interface unit 107*a* after the product shipment.

It should be noted that, instead of providing the image temporary storage area 1032 in the RAM 103, a buffer memory for temporarily storing the image data may be provided in the imaging unit 110 or the image signal processing unit 111.

<Appearance of Imaging Apparatus>

FIG. 3 is an explanatory diagram showing an example of an appearance of the imaging apparatus 1 of FIG. 1. FIG. 3(*a*) is a front view of the imaging apparatus 1, and FIG. 3(*b*) is a rear view of the imaging apparatus 1.

As shown in FIG. 3(*a*), lenses constituting the imaging unit 110 are arranged on a front of the imaging apparatus 1. In addition, in an upper right part of the imaging apparatus 1, a power button 113-1 constituting the operation unit 113 is arranged, and in an upper left part thereof, a shutter button 113-2 constituting the operation unit 113 is arranged.

As shown in FIG. 3(*b*), the display unit 112 is arranged on a back of the imaging apparatus 1. On a right side of the display unit 112, a selection/decision operation button 113-3, a menu button 113-4, and a reproducing button 113-5 constituting the operation unit 113 are each arranged in this order from upward to downward.

The selection/decision operation button 113-3 is a button for selecting and deciding a menu or the like. The menu button 113-4 is a button for performing various setting and selection, etc. of file operation processings. The reproducing button 113-5 is a button for reproducing the image data recorded in the storage unit 104 or the recording medium 106.

<Overall Operation of Imaging Apparatus>

Figure 4:
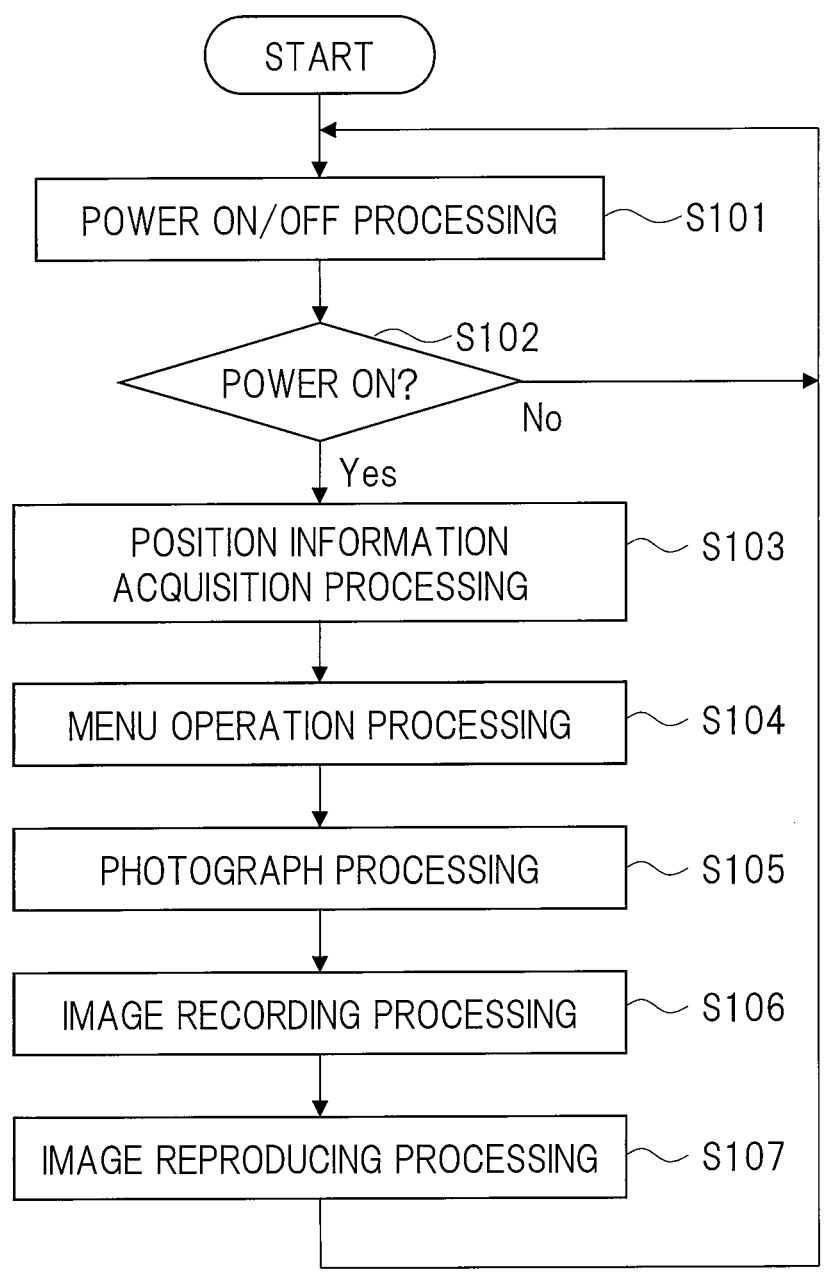
FIG. 4 is a flowchart showing an example of the overall operation of the imaging apparatus of FIG. 1.

FIG. 4 is a flowchart showing an example of the overall operation about the imaging apparatus 1 of FIG. 1.

First, in the power management unit 1026, a press of power button 113-1 is checked, and a power on/off processing for turning on/off the power supply of the imaging apparatus 1 is performed (step S101). If the power supply is turned off (No), the process branches to the power on/off processing in step S101, and the press of the power button 113-1 is checked again (step S102). If the power supply is turned on (Yes), a position information acquisition processing for acquiring position information on the imaging apparatus 1 is performed by the position information acquisition unit 1022 based on the signals received by the GPS receiver unit 115 in FIG. 1 (step S103).

Subsequently, in the basic operation executing unit 1021, a press of the menu button 113-4 is checked, and a menu operation processing for selecting and executing various kinds of settings and processings of the imaging apparatus 1 is performed (step S104).

Then, in the photograph processing unit 1023, a press of the shutter button 113-2 is checked, image data imaged by the imaging unit 110 is acquired, and a photograph processing for storing the image data in the image temporary storage area 1032 of the RAM 103 is performed (step S105).

In the image recording unit 1024, an image recording processing for recording, in the storage unit 104 or the recording medium 106, the image data acquired in the photograph processing unit 1023 (processing in step S105) is performed (step S106).

In the image reproducing unit 1025, a press of the reproducing button 113-5 is checked, and an image reproducing processing for reproducing the image data recorded in the storage unit 104 or the recording medium 106 is performed (step S107).

By the above processing in S101 to S107, the recording and reproducing operations of images are performed. It should be noted that the processings in S101 to S107 shown in FIG. 4 are repeatedly executed.

<Power On/Off Processing>

Subsequently, the operation of the power on/off processing by the power management unit 1026 will be described with reference to FIG. 5.

Figure 5:
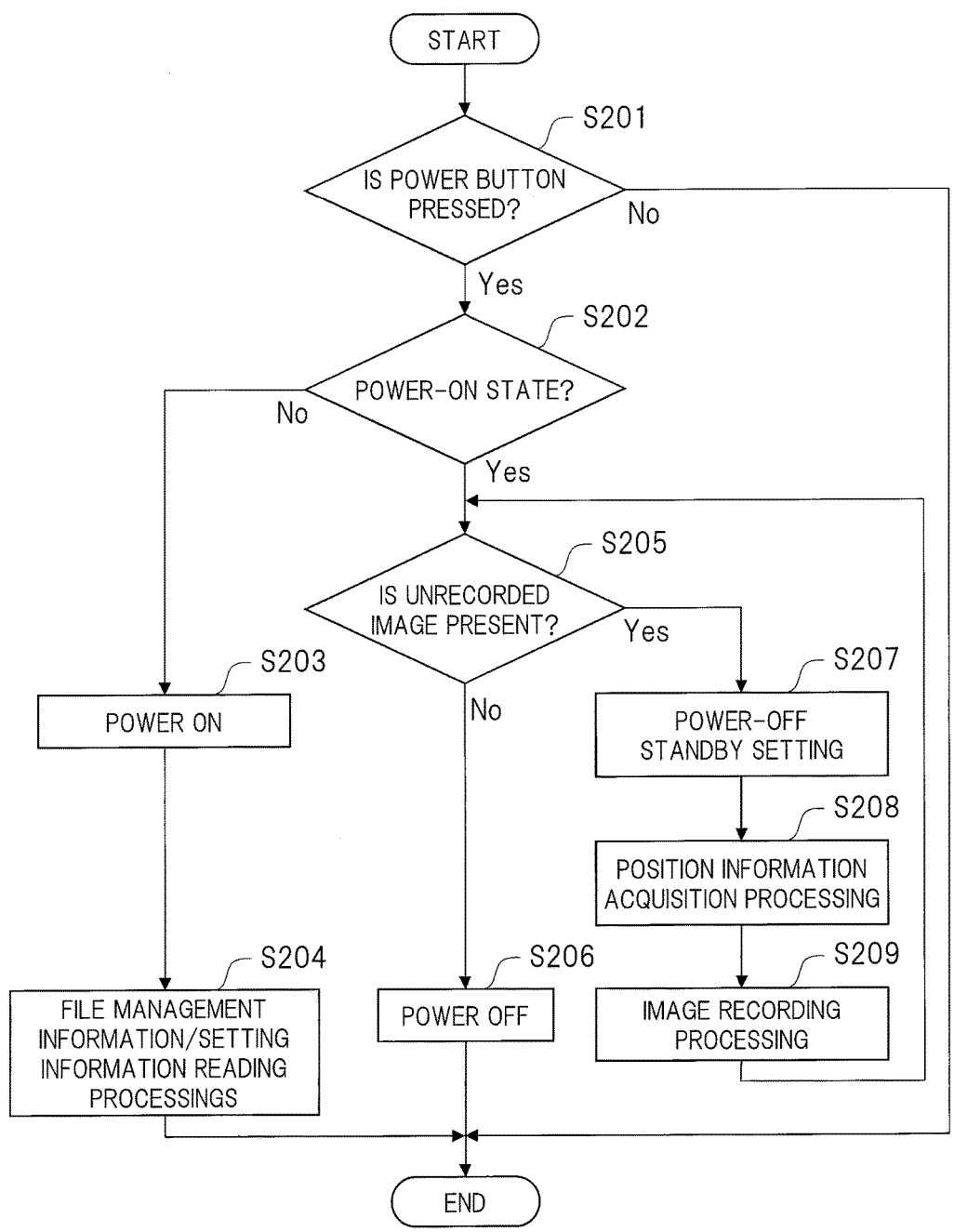
FIG. 5 is a flowchart showing an example of a processing in step S101 of FIG. 4.

FIG. 5 is a flowchart showing an example of the processing about step S101 of FIG. 4.

First, a press of the power button 113-1 is checked, and a branch processing is performed (step S201). If the power button 113-1 is not pressed (No), the processing is ended. If the power button 113-1 is pressed (Yes), a branch processing is performed depending on whether or not the power is in an on-state (step S202).

If the power is in an off-state (No) in a processing of step S202, the power is turned on, and power is supplied from the power supply unit 116 to each unit constituting the imaging apparatus 1 (step S203). Then, performed is reading or the like of management information such as an image file recorded in the storage unit 104 or the recording medium 106 and of various kinds of pieces of setting information stored in the setting information storage area 1041 stored in the storage unit 104. Therefore, the processing is ended (step S204).

On the other hand, if the power is in an on-state (Yes) in the processing of step S202, the branch processing is performed depending on whether or not there is image data not recorded in the storage unit 104 or the recording medium 106 in the image data stored in the image temporary storage area 1032 of the RAM 103(step S205).

If there is no unrecorded image in a processing in step S205 (No), the power is turned off, and the processing is ended (step S206). If the power is turned off, in order to reduce the power consumption, the supply of power is suspended from the power supply unit 116 to a part(s) other than the main controller unit 101, the timer unit 114, the operation input of the power button 113-1, and the like.

If there is an unrecorded image (Yes) in the processing of step S205, the supply of power is suspended to the display unit 112 and the like, and the processing is set to the power-off standby state (step S207). In the power-off standby state, the power from the power supply unit 116 is supplied at least to the GPS receiver unit 115 and to a part(s) necessary for recording the image data stored in the image temporary storage area 1032 of the RAM 103 in the storage unit 104 or the recording medium 106.

Then, the position information acquisition processing by the position information acquisition unit 1022 (step S208) and the image recording processing by the image recording unit 1024 (step S209) are performed, and the process returns to the processing of step S205.

By the above processing, the processings of steps S205 to S209 are repeated until all the image data stored in the image temporary storage area 1032 of the RAM 103 is recorded in the storage unit 104 or the recording medium 106, and are operated so that the power is turned off when the image data to be recorded runs out.

<Position information Acquisition Processing>

Next, an operation of a position information acquisition processing by the position information acquisition unit 1022 will be described with reference to FIG. 6.

Figure 6:
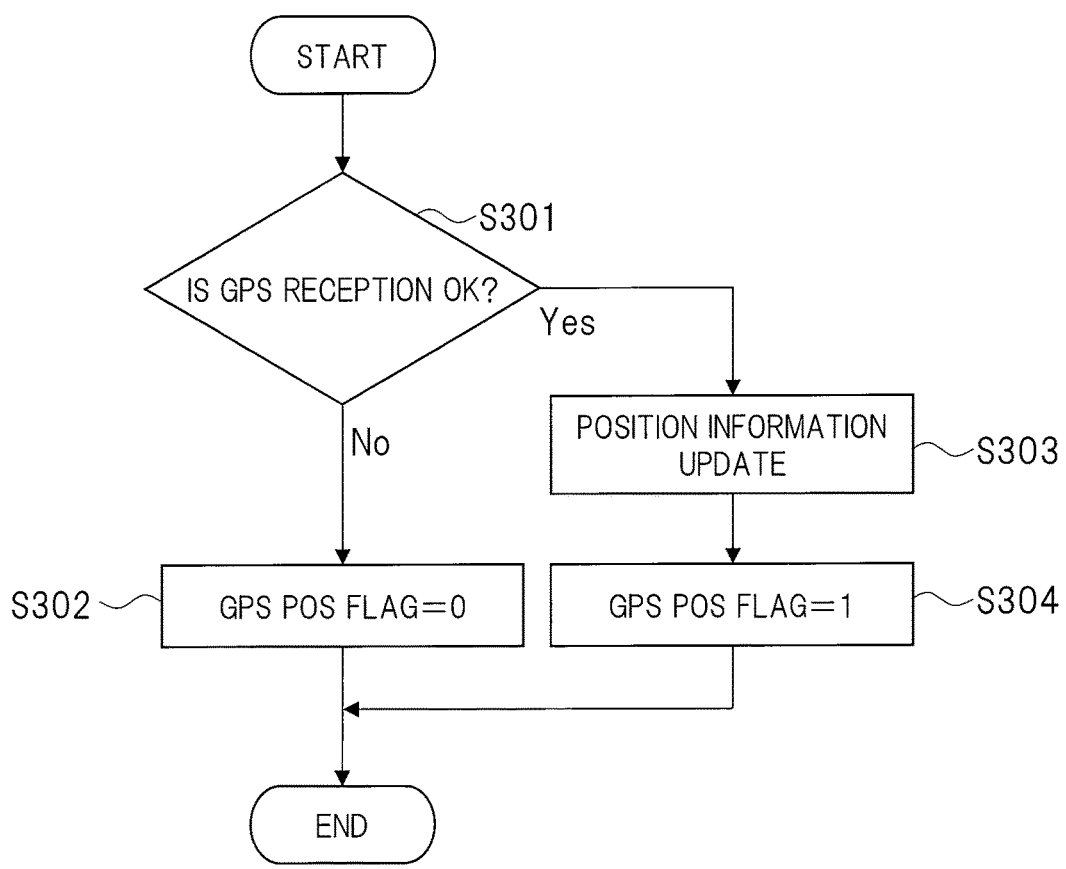
FIG. 6 is a flowchart showing an example of a processing in step S103 of FIG. 4.

FIG. 6 is a flowchart showing an example of the processing about step S103 of FIG. 4 or step S208 in FIG. 5.

First, a reception condition of the GPS receiver unit 115 is checked, and a branch processing is performed according to predetermined conditions (step S301). Here, the predetermined conditions are, for example, whether or not GPS signals from at least three or more GPS satellites are received.

If the conditions are not satisfied (No), a flag indicating an acquisition condition of the GPS position information (GPS POS FLAG) is set to 0 (step S302), and the processing is ended. In addition, if the conditions are satisfied (Yes), the position including latitude and longitude of the imaging apparatus 1 is calculated based on the GPS signals from the GPS satellites, and the position information is updated (step S303).

After that, the flag indicating the acquisition condition of the GPS position information (GPS POS FLAG) is set to 1 (step S304), and the processing is ended.

By the above processing, if the position information can be acquired, position information acquisition condition flag (GPS POS FLAG)=1 is set, and if the position information cannot be acquired, position information acquisition condition flag (GPS POS FLAG)=0 is set.

Therefore, by checking the position information acquisition condition flag (GPS POS FLAG), whether or not the position information can be acquired can be determined.

<Menu Operation Processing>

Subsequently, an operation of the menu operation processing for selecting and executing various kinds of settings/processings of the imaging apparatus 1 in the basic operation executing unit 1021 shown in FIG. 4 (S104) will be described with reference to FIGS. 7 and 8.

Figure 7:
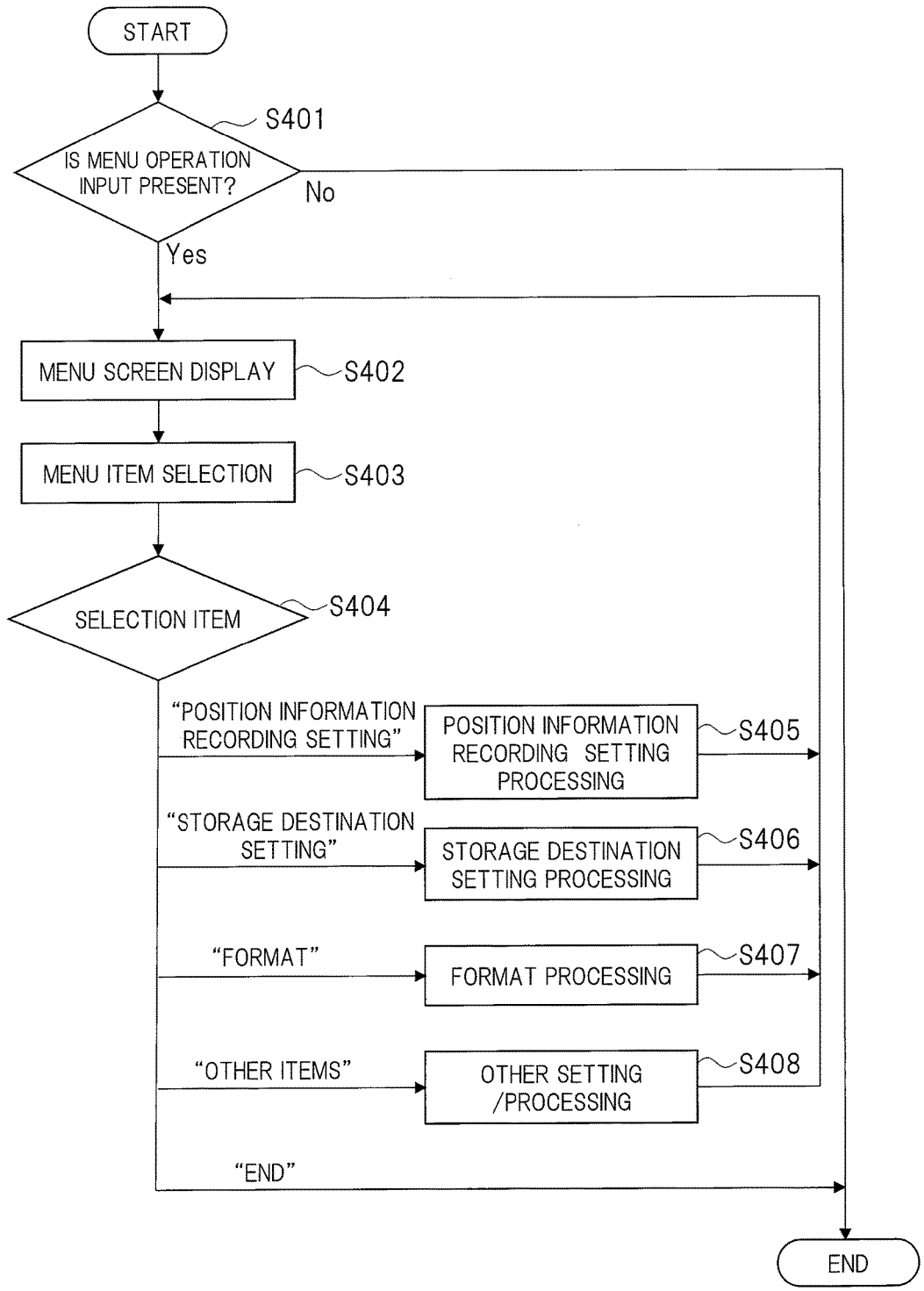
FIG. 7 is a flowchart showing an example of a processing in step S104 of FIG. 4.

FIG. 7 is a flowchart showing an example of the processing about step S104 of FIG. 4. FIG. 8 is an explanatory diagram showing a display example of the menu display screen displayed on the display unit 112 of the imaging apparatus 1 of FIG. 1 in the processing about step S104 of FIG. 4.

First, in FIG. 7, a press of the menu button 113-4 is checked, and a branch processing is performed (step S401). If the menu button 113-4 is not pressed (No), the processing is ended.

Figure 8:
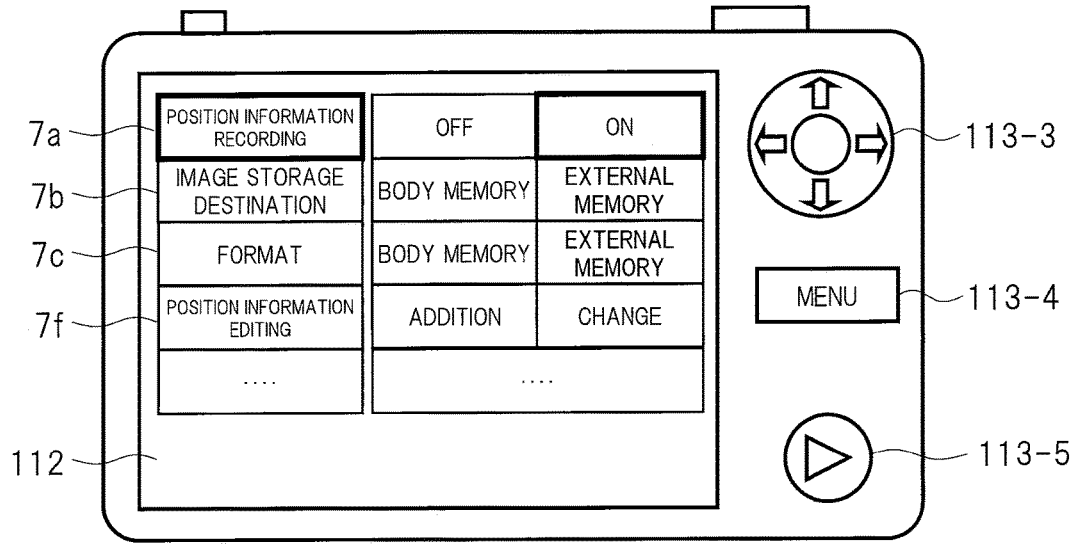
FIG. 8 is an explanatory diagram showing a display example of a menu display screen displayed on a display unit of the imaging apparatus of FIG. 1 in the processing about step S104 of FIG. 4.

If the menu button 113-4 is pressed (Yes), various kinds of setting/processing items of the imaging apparatus 1 are displayed on the display unit 112 as shown in FIG. 8 (step S402).

Here, in a display example of a setting screen in FIG. 8, shown is an example in which position information recording 7*a*, an image storage destination 7*b*, a format 7*c*, position information editing 7*f*, and the like are displayed as setting items. The position information recording 7*a* sets whether to record the position information as additional information on metadata of image data.

The image storage destination 7*b* sets whether to store the image storage destination in the storage unit 104 of a body of the imaging apparatus 1 or in the recording medium 106. The format 7*c* is a display of a format processing for initializing the storage unit 104 of the body of the imaging apparatus 1 or the recording medium 106. In addition, the position information editing 7*f* will be described in detail in a fourth embodiment described below.

Subsequently, in FIG. 7, selection/decision inputs of menu items are performed by a selection/decision operation button 113-3 (step S403), and a branch processing is performed depending on the selected item (step S404).

If the position information recording 7*a* is selected, whether or not the position information is recorded is set (step S405), and the process returns, again, to the processing of S402 that is the menu screen display processing. If the image storage destination 7*b* is selected, the image data storage destination is set (step S406), and the process returns, again, to the processing of S402 that is the menu screen display processing.

If the format 7*c* is selected, the format processing of the storage unit 104 of the imaging apparatus 1 or the recording medium 106 is performed (step S407), and the process returns, again, to the processing of S402 that is the menu screen display processing.

If another setting item is selected, a setting/processing depending on the selected item is performed (step S408), and the process returns, again, to the processing of S402 that is the menu screen display processing. If "end" is selected by pressing the menu button 113-4, the step S104 that is the menu processing for performing various kinds of settings/processings is ended.

By the above processing, various kinds of settings/processings of the imaging apparatus 1 are performed.

<Photograph Processing>

Next, an operation of a photograph processing by the photograph processing unit 1023 will be described with reference to FIG. 9.

Figure 9:
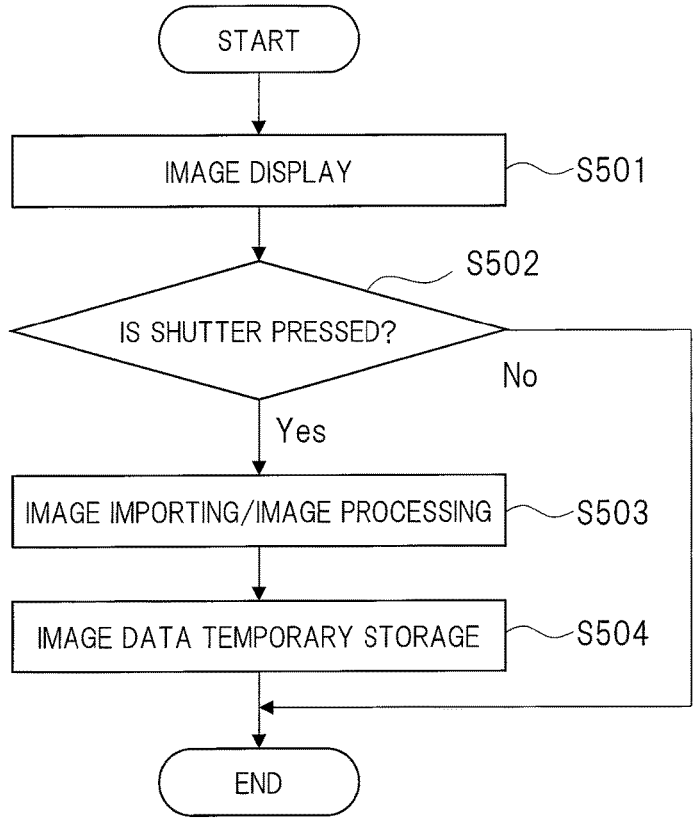
FIG. 9 is a flowchart showing an example of a processing in step S105 of FIG. 4.

FIG. 9 is a flowchart showing an example of the processing about step S105 of FIG. 4.

First, an image imaged by the imaging unit 110 is displayed on the display unit 112 (step S501). A press of the shutter button 113-2 is checked, and a branch processing is performed (step S502). If the shutter button 113-2 is not pressed (No), the processing is ended.

If the shutter button 113-2 is pressed (Yes), data of an image imaged by the imaging unit 110 is imported, and an image processing such as white balance adjustment, exposure adjustment, and gamma correction, a processing for converting the imported data into image data such as JPEG, and the like are performed by the image signal processing unit 111 (step S503).

Thereafter, the image data processed in the image signal processing unit 111 is stored in the image temporary storage area 1032 of the RAM 103, and the processing is ended (step S504).

By the above processing, data of the image imaged by the imaging unit 110 is stored in the image temporary storage area 1032 of the RAM 103.

<Image Recording Processing>

Subsequently, an operation of an image recording processing by the image recording unit 1024 will be described with reference to FIG. 10.

Figure 10:
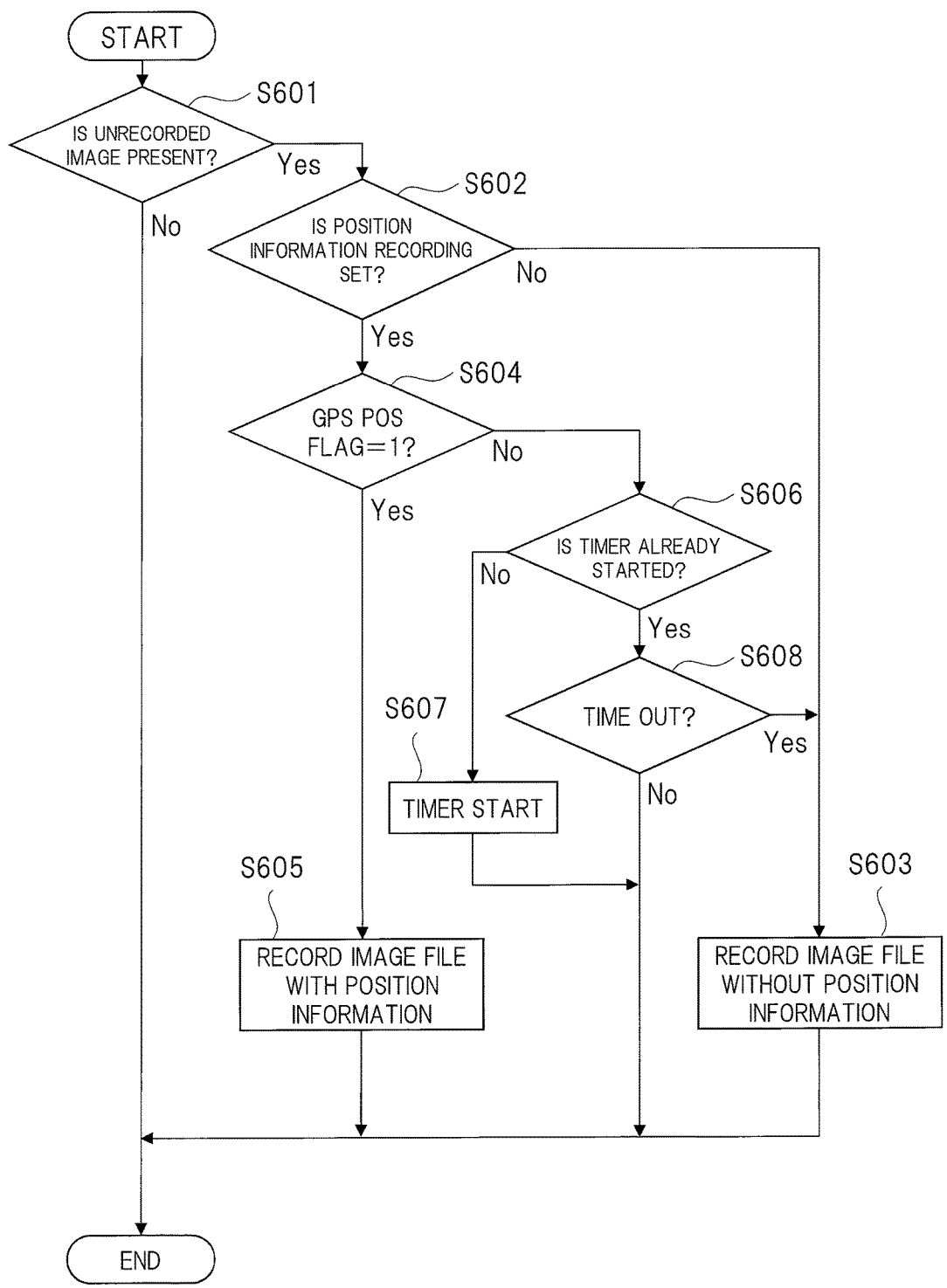
FIG. 10 is a flowchart showing an example of a processing in step S106 of FIG. 4.

FIG. 10 is a flowchart showing an example of the processing about step S106 of FIG. 4 and step S209 of FIG. 5.

First, a branch processing is performed depending on whether or not there is image data stored in the image temporary storage area 1032 of the RAM 103 and not recorded in the storage unit 104 or the recording medium 106 (step S601). If there is not the unrecorded image data (No), the image recording processing is ended.

In the processing of S601, if there is the unrecorded image data (Yes), a branch processing is performed depending on whether or not the position information is set to be added to and recorded on the image data (step S602).

In the processing of step S602, if the position information is not set to be added to and recorded on the image data (No), the image data is recorded as an image file in which the position information is not added as metadata in the storage unit 104 or the recording medium 106 set as a storage destination (step S603), and the image recording processing is ended.

In the processing of step S602, if the position information is set to be added to and recorded on the image data (Yes), a branch processing is performed depending on the position information acquisition condition flag (GPS POS FLAG) (step S604).

In the processing of step S604, if the position information acquisition condition flag (GPS POS FLAG)=1 is set(Yes), the image data is recorded as an image file in which the acquired position information is added as metadata in the storage unit 104 or the recording medium 106 set as a storage destination (step S605), and the image recording processing is ended. Thus, stored can be the image data in which the position information acquired by the position information acquisition unit 1022 is added, as the information on the position where the image data is acquired, to the metadata.

In the processing of step S604, if the position information acquisition condition flag (GPS POS FLAG)=0 is set (No), a branch processing depending on whether or not a timer is started is performed (step S606).

In the processing of step S606, if the timer is not started (No), the timer set for a predetermined time is started (step S607), and the image recording processing is ended. Time set by the timer is determined in consideration of a period from a time of turning on the power to a time of making it possible to acquire the position information by GPS. The time may be set in advance at a time of shipment of the imaging apparatus 1, or may be set by the user.

In the processing of step S606, if the timer is started (Yes), a branch processing is performed depending on whether or not the timer times out (step S608). If the timer does not time out (No), the image recording processing is ended.

Thereafter, the position information acquisition processing in step S103 of FIG. 4 is executed, and the position information is acquired. In addition, if position information is not acquired by the subsequent position information acquisition processing, the position information acquisition processing is executed until the timer times out.

Since a time-out period is determined in consideration of the period from the time turning on the power of the imaging apparatus 1 to the time of making it possible to acquire the position information by the GPS as described above, the position information can be acquired before the time-out even if a photograph(s) is taken immediately after turning on the power of the imaging apparatus 1.

In addition, if the timer times out (Yes), the image data is recorded as an image file in which the position information is not added as metadata in the storage unit 104 or the recording medium 106 set as a storage destination (step S603), and the image recording processing is ended. Incidentally, in this case, the position information is set to be recorded, but recording is performed without adding the position information as metadata.

Therefore, since the position information cannot be acquired, being recorded as the image file in which the position information is not added is displayed on the display unit 112, and may be notified to the user.

By the above processing, according to the setting of the position information recording, the position information is added or not added as metadata to the image data stored in the image temporary storage area 1032 of the RAM 103 serving as a first memory, and is recorded in the storage unit 104 or the recording medium 106 serving as a second memory.

<Image Reproducing Processing>

Subsequently, an operation of an image reproducing processing by the image reproducing unit 1025 will be described with reference to FIG. 11.

Figure 11:
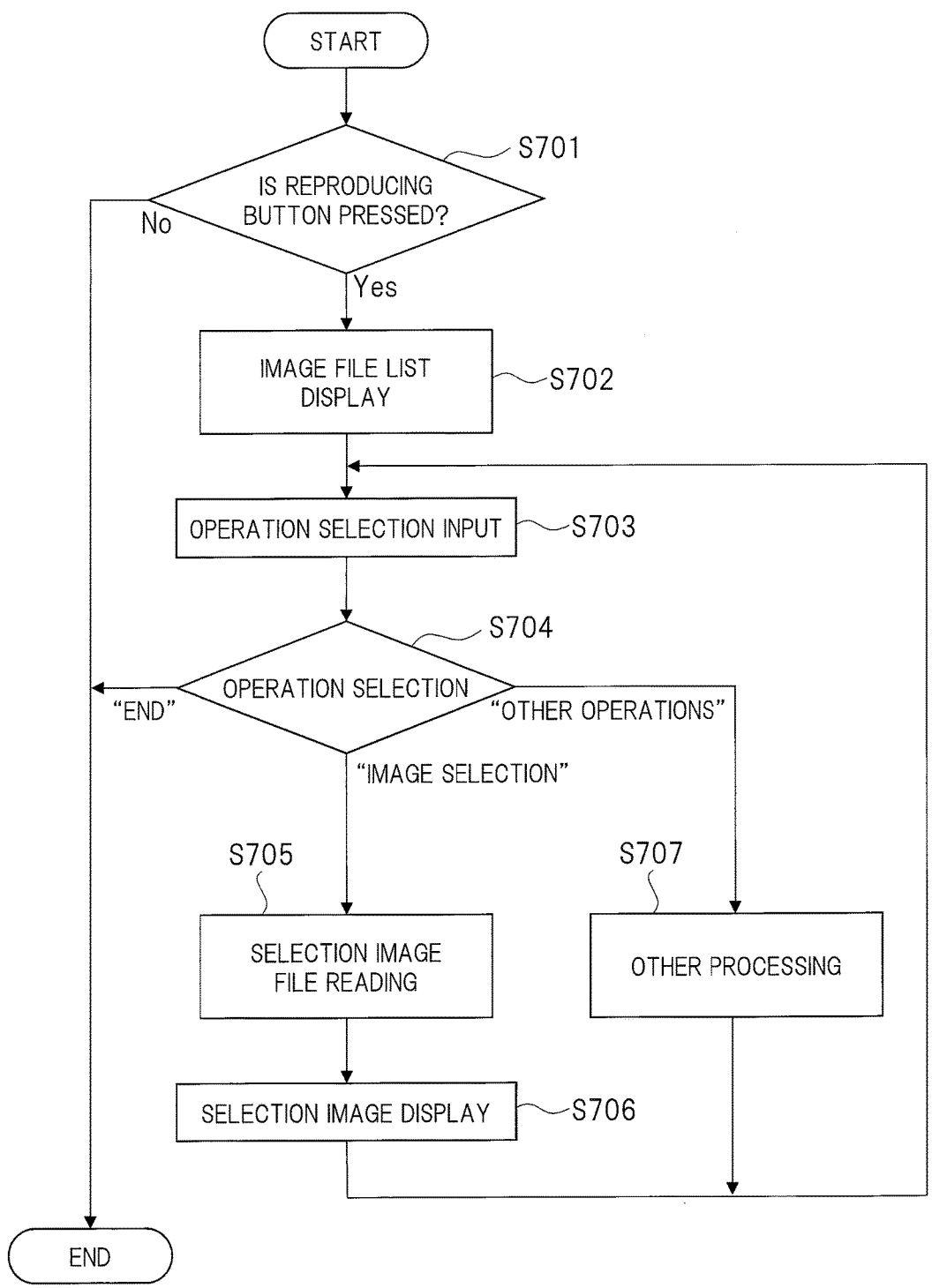
FIG. 11 is a flowchart showing an example of a processing in step S107 of FIG. 4.

FIG. 11 is a flowchart showing an example of the processing about step S107 of FIG. 4. FIG. 12 is an explanatory diagram showing a display example of a display screen displayed on the display unit 112 that the imaging apparatus 1 of FIG. 1 has in the image reproducing processing of FIG. 11. FIG. 12($a$) shows an example of a list display of image files, and FIG. 12($b$) shows a display example of the selected image data.

In FIG. 11, a press of the reproducing button 113-5 is checked, and a branch processing is performed (step S701). If the reproducing button 113-5 is not pressed (No), the image reproducing processing is ended.

If the reproducing button 113-5 is pressed (Yes), metadata such as a file name, photographing date and time, and an thumbnail image is read from the image file stored in the storage unit 104 or the recording medium 106 set as a storage destination, and is list-displayed as shown in FIG. 12($a$) (step S702).

In FIG. 12($a$), thumbnail images 11$a$ of image files of "A" to "P" are displayed on the display unit 112, and selection frames of the images to be reproduced are displayed.

Then, in FIG. 11, an input for selecting an image to be reproduced is performed (step S703). The processing moves and decides a selection frame 11$b$ displayed by a bold frame with the selection/decision operation button 113-3 (the selection frame moves to "F" in the example of FIG. 12($a$)), and thereby an input such as selection of the image to be reproduced is performed.

Thereafter, a branch processing is performed in response to an operation selection input in step S703 (step S704). If "end" is selected by pressing the reproducing button 113-5 again, the reproducing processing is ended.

In the processing of step S704, if an image to be reproduced is selected ("image selection"), the selected image file is read (step S705). Then, the image data of the read image file is displayed on the display unit 112 of the imaging apparatus 1 as shown in FIG. 12(b) (step S706), and the process returns to the processing of step S703.

In addition, in the processing of step S704, if "other operation" is selected, a processing corresponding to the selected operation is performed (step S707), and the process returns to processing of step S703.

By the above processing, an image file stored in the storage unit 104 or the recording medium 106 is reproduced.

In the above embodiment, when the power button is pressed and the power is turned off, the position information acquisition processing S208 and the image recording processing S209 are repeated until all the image data stored in the image temporary storage area 1032 of the RAM 103 is recorded in the storage unit 104 or the recording medium 106.

In addition, in the image recording processing S208, the position information acquired before the timer times out is added to the image data stored in the RAM 103 serving as the first memory and is recorded in the storage unit 104 or the recording medium 106 serving as the second memory.

Thus, even if the position information by the GPS is not fixed in a period from a time of turning on the power to a time of pressing the shutter, generation of the image data that has erroneous position information or in which position information is not acquired can be reduced, and therefore convenience of the imaging apparatus 1 can be improved.

(Second Embodiment)
<Outline>

In the first embodiment, the position information is acquired by GPS signals. In the present second embodiment, however, a technique for acquiring position information by using not only the GPS signals but also unique information on wireless access points will be described.

<Configuration Example of Imaging Apparatus>

Figure 13:
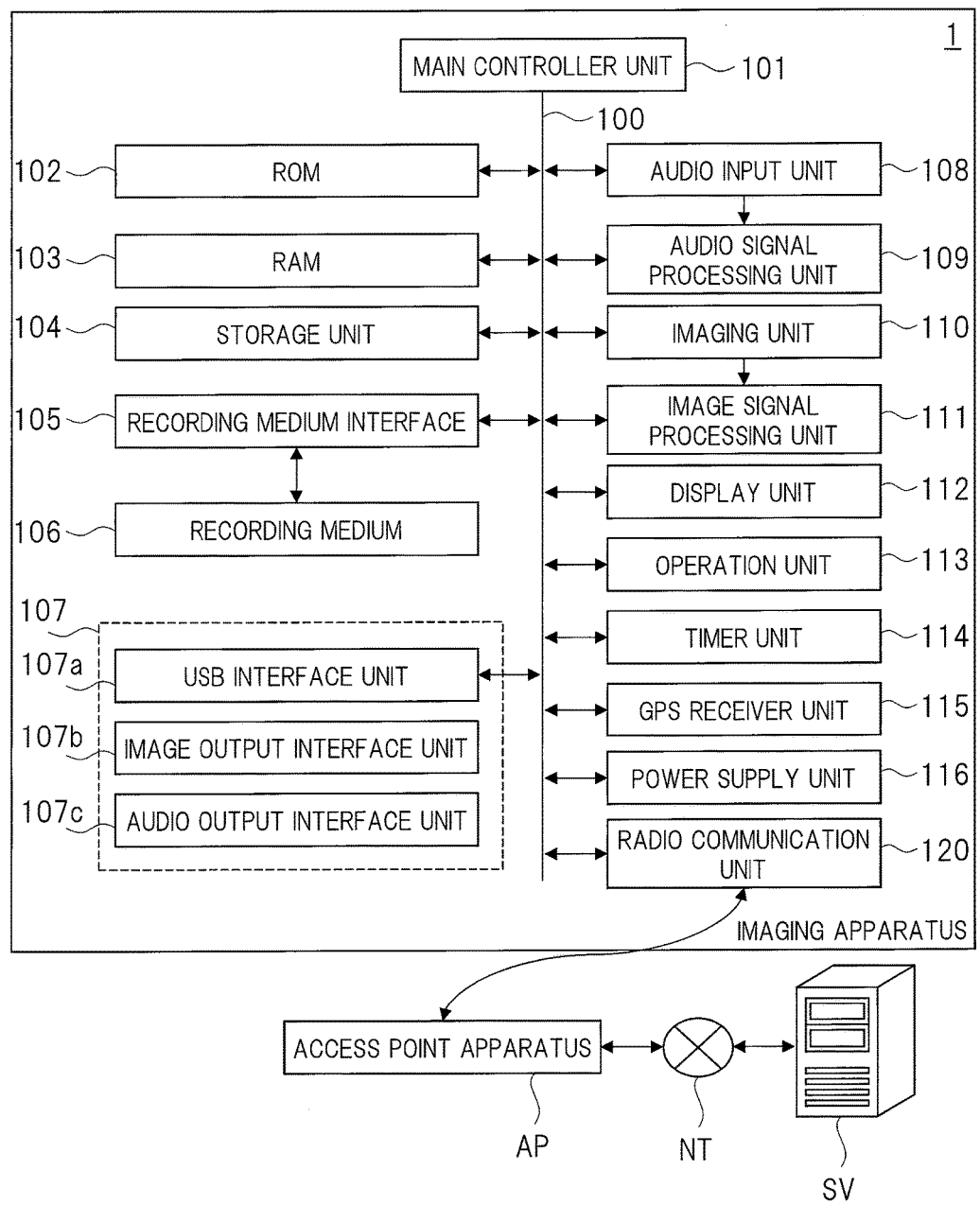
FIG. 13 is a block diagram showing an example of a configuration about an imaging apparatus according to the present second embodiment.

FIG. 13 is a block diagram showing an example of a configuration of an imaging apparatus 1 according to the present second embodiment.

The difference of the imaging apparatus 1 shown in FIG. 13 from the imaging apparatus 1 of FIG. 1 according to the first embodiment is that a radio communication unit 120 is newly provided. The other configurations are the same as those in FIG. 1, so that their descriptions are omitted.

The radio communication unit 120 is connected to a network NT through an access point apparatus AP, and transmits and receives data to and from a server apparatus SV connected to the network NT The network NT is a communication line such as an Internet line.

The radio communication unit 120 performs connection with the access point apparatus AP by radio connection, for example, Wi-Fi. The Wi-Fi is a communication standard of radio LAN such as IEEE 802.11. The access point apparatus AP has unique information such as a service set identifier (SSID) and a media access control (MAC) address.

In addition, the server apparatus SV has position information data tied to unique information on the access point apparatus AP. The position information on the access point apparatus AP can be acquired by sending the server apparatus SV the unique information on the access point apparatus AP through the network NT.

<Software Configuration of Imaging Apparatus>

Figure 14:
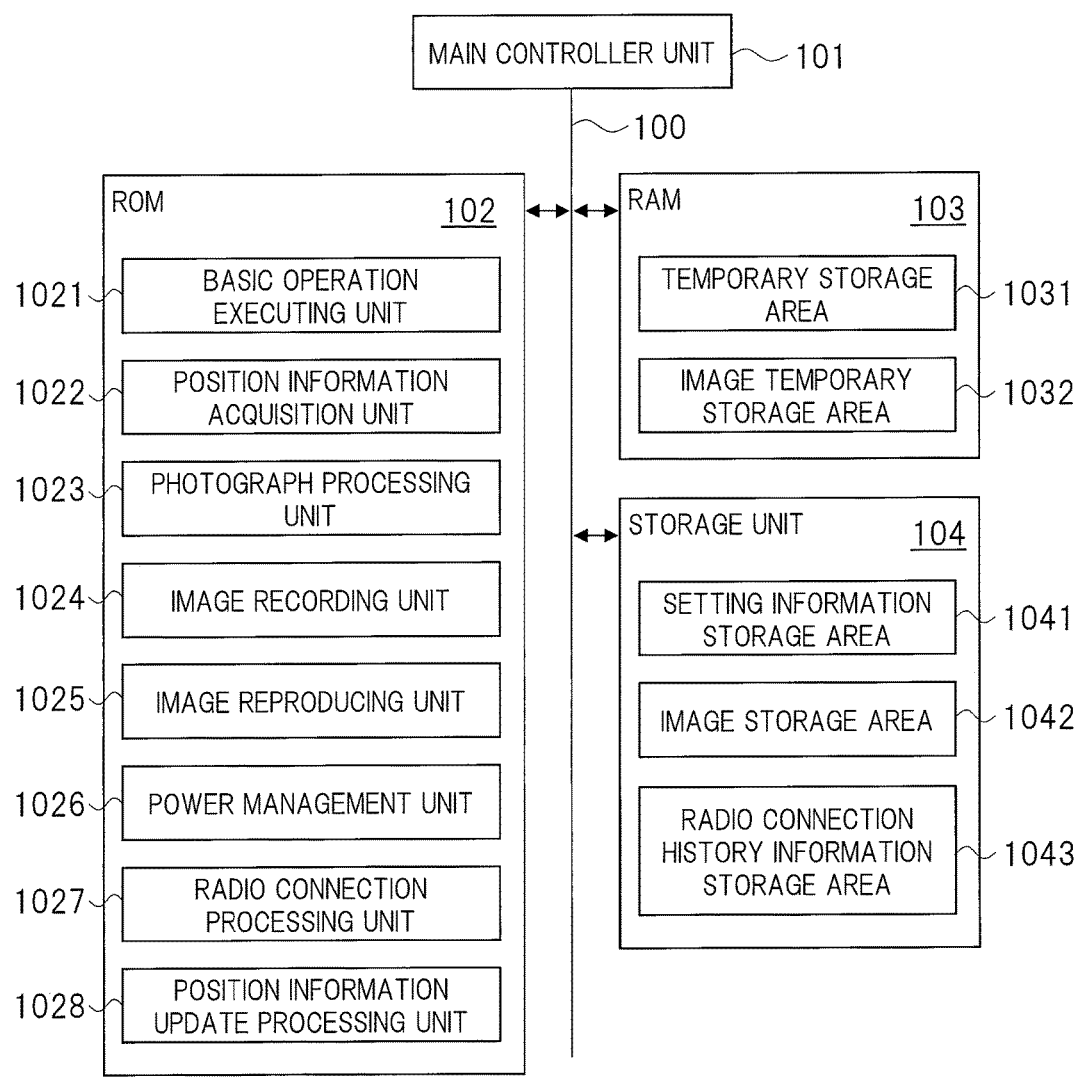
FIG. 14 is an explanatory diagram showing an example of a configuration about software stored in a ROM, a RAM, and a storage unit included in the imaging apparatus of FIG. 13.

FIG. 14 is an explanatory diagram showing an example of a configuration of software stored in each of the ROM 102, the RAM 103, and the storage unit 104 that are included in the imaging apparatus 1 of FIG. 13.

In FIG. 14, a program stored in the ROM 102 newly stores a radio connection processing unit 1027 and a position information update processing unit 1028 in the program shown in FIG. 2 of the first embodiment. The other programs are the same as those in FIG. 2, so that their descriptions are omitted.

The radio connection processing unit 1027 performs a processing of the radio connection with the access point apparatus AP by controlling the radio communication unit 120 of FIG. 13. The position information update processing unit 1028 performs a processing for updating the position information on the metadata of the image file recorded in the storage unit 104 or the recording medium 106 of FIG. 13.

In addition, a storage area of the RAM 103 in FIG. 14 includes a temporary storage area 1031 and an image temporary storage area 1032, which are the same as those in FIG. 2. The storage unit 104 includes a configuration of newly having a radio connection history information storage area 1043 in addition to a setting information storage area 1041 and an image storage area 1042 similar to those of FIG. 2.

The radio connection history information storage area 1043 is an area for storing history information when Wi-Fi connection is made by the radio connection processing unit 1027.

<Position information Acquisition Processing>

Subsequently, an operation example of a position information acquisition processing (processing about step S103 of FIG. 4 or step S208 of FIG. 5) by the position information acquisition unit 1022 will be described with reference to FIG. 15. In the following, the overall operation in the imaging apparatus 1 is the same as that in FIG. 4 of the first embodiment.

Figure 15:
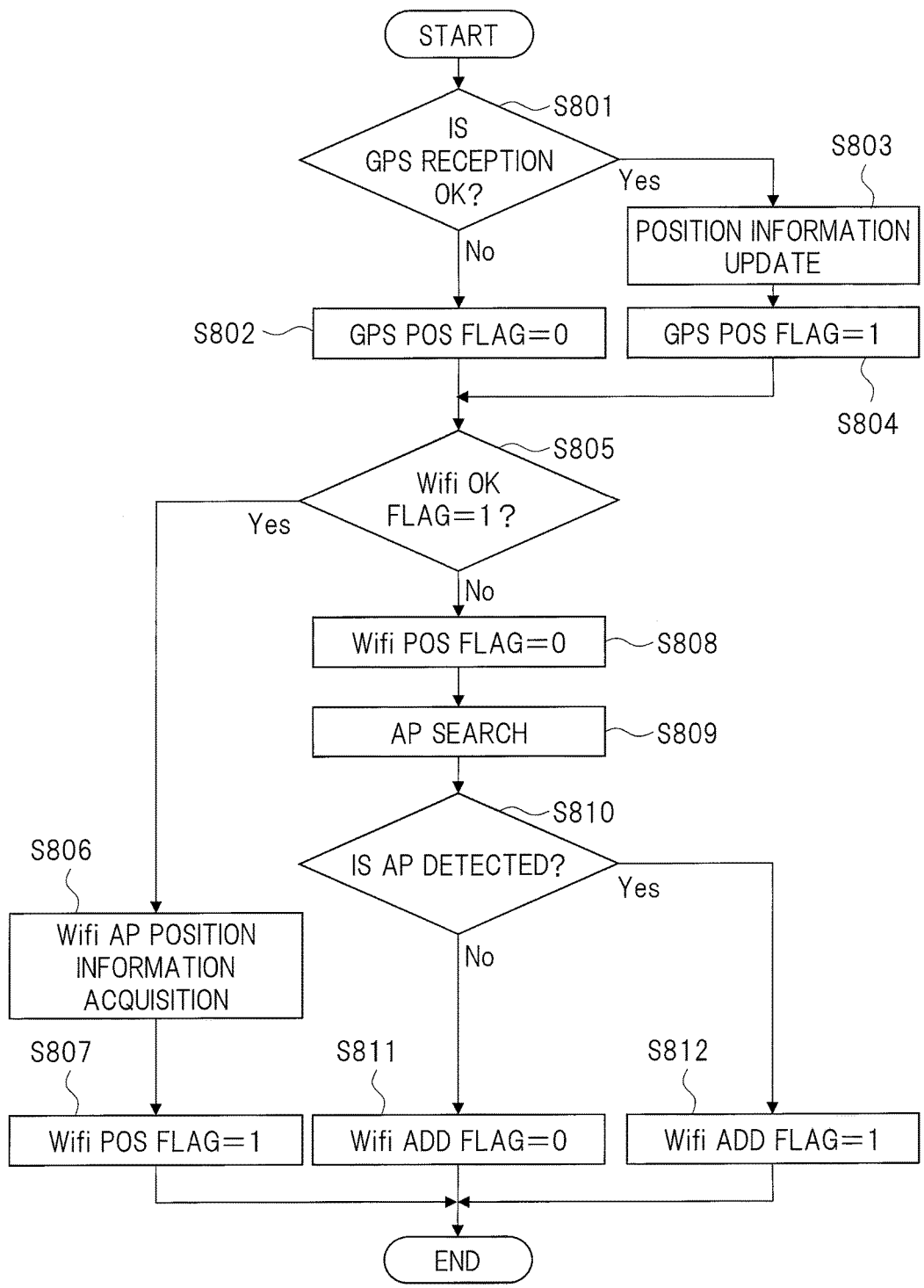
FIG. 15 is a flowchart showing an example of a position information acquisition processing by a position information acquisition unit of FIG. 14.

FIG. 15 is a flowchart showing an example of a position information acquisition processing by the position information acquisition unit 1022 in FIG. 14.

First, a reception condition of the GPS receiver unit 115 is checked, and a branch processing is performed according to predetermined conditions (step S801). The predetermined conditions are, for example, whether or not GPS signals from at least three or more GPS satellites are received.

In the processing of step S801, if the conditions are not satisfied (No), a flag indicating an acquisition condition of GPS position information (GPS POS FLAG) is set to 0 (step S802).

In the processing of step S801, if the conditions are satisfied (Yes), a position including latitude and longitude of the imaging apparatus 1 is calculated based on the GPS signals from the GPS satellites, and the position information is updated (step S803). Then, the flag indicating the acquisition condition of the GPS position information (GPS POS FLAG) is set to 1 (step S804).

Subsequently, branching by a connection condition flag being a flag indicating the connection condition by Wi-Fi (Wifi OK FLAG) is performed (step S805). If the connection condition flag (Wifi OK FLAG)=1 is set (Yes), the unique information (such as SSID and MAC address) on the access point apparatus AP is transmitted to the server apparatus SV, and the position information on the access point apparatus AP is acquired from the server apparatus SV (step S806).

Here, in a Wifi connection processing to be described below, correction of the position information may be made by using information on a radio wave reception level of Wifi acquired in searching for an access point. Thus, accuracy of position information obtained by photographing the image can be improved.

Furthermore, if a plurality of access point apparatuses AP are detected in searching for access points, the unique information on those access point apparatuses AP is transmitted to the server apparatus SV, and the position information on the plurality of access point apparatuses is acquired. Then, the correction of the position information may be made by using the information on the reception levels of radio waves acquired from the access point apparatuses AP.

For this reason, the accuracy of the position information obtained by photographing the image can be improved.

It should be noted that, as the unique information on the access point apparatuses AP, the unique information on the access point apparatuses AP including the reception levels of radio waves may be transmitted to the server apparatus SV, and the position information whose correction is made in the server apparatus SV by using the information on the reception levels of radio waves may be acquired.

Subsequently, the flag indicating the acquisition condition of the position information by Wifi (Wifi POS FLAG) is set to 1 (step S807), and the processing is ended.

In the processing of step S805, if the connection condition flag (Wifi OK FLAG)=0 is set (No), the flag (Wifi POS FLAG) indicating the acquisition condition of the position information by Wifi is set to 0 (step S808).

Thereafter, a peripheral wireless access point apparatus AP is searched (step S809), and its SSID, MAC address, radio wave reception level, and the like are acquired as the unique information. Then, a branch processing is performed depending on whether or not the access point apparatus AP is detected (step S810).

If the access point apparatus AP is not detected (No), the flag (Wifi ADD FLAG) indicating the acquisition condition of the unique information on the Wifi access point is set to 0 (step S811), and the processing is ended.

In addition, if the access point apparatus AP is detected (Yes), the flag (Wifi ADD FLAG) indicating the acquisition condition of the unique information on the Wifi access point is set to 1 (step S812), and the processing is ended.

By the above processing, the position information by GPS signals, the position information by Wifi, or the unique information on the Wifi access point is acquired.

<Menu Operation Processing>

Next, an operation of a menu operation processing (processing in step S105 of FIG. 4) for selecting and executing various kinds of settings/processings of the imaging apparatus 1 in the basic operation executing unit 1021 will be described with reference to FIGS. 16 and 17.

Figure 16:
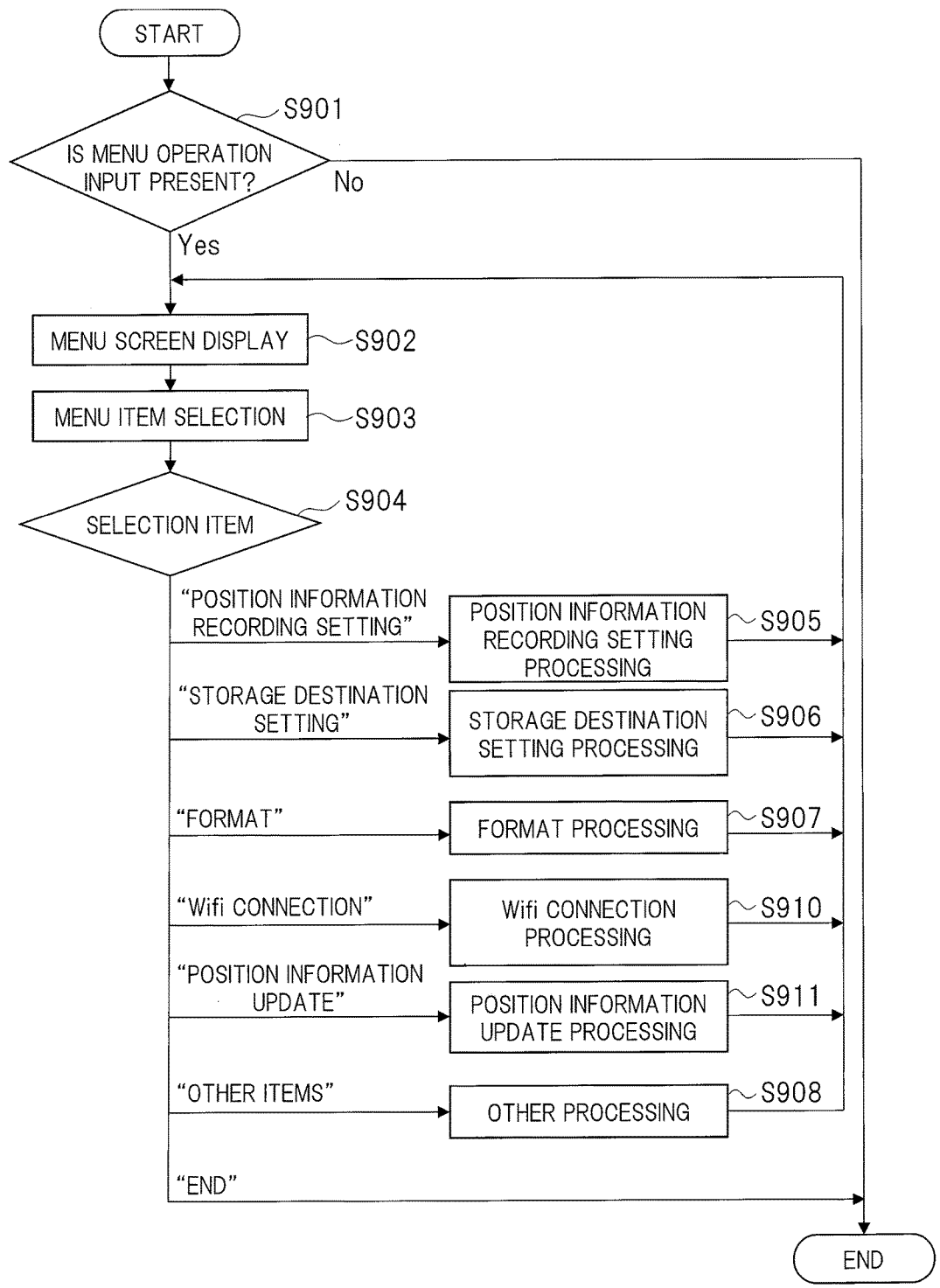
FIG. 16 is a flowchart showing an example of a menu operation processing by a basic operation executing unit of FIG. 14.

FIG. 16 is a flowchart showing an example of a menu operation processing by the basic operation executing unit 1021 of FIG. 14. FIG. 17 is an explanatory diagram showing a display example of the menu display screen displayed on the display unit 112 of the imaging apparatus 1 of FIG. 1 in the menu operation processing of FIG. 16.

In FIG. 16, first, a press of the menu button 113-4 is checked, and a branch processing is performed (step S901). If the menu button 113-4 is not pressed (No), the processing is ended.

Figure 17:
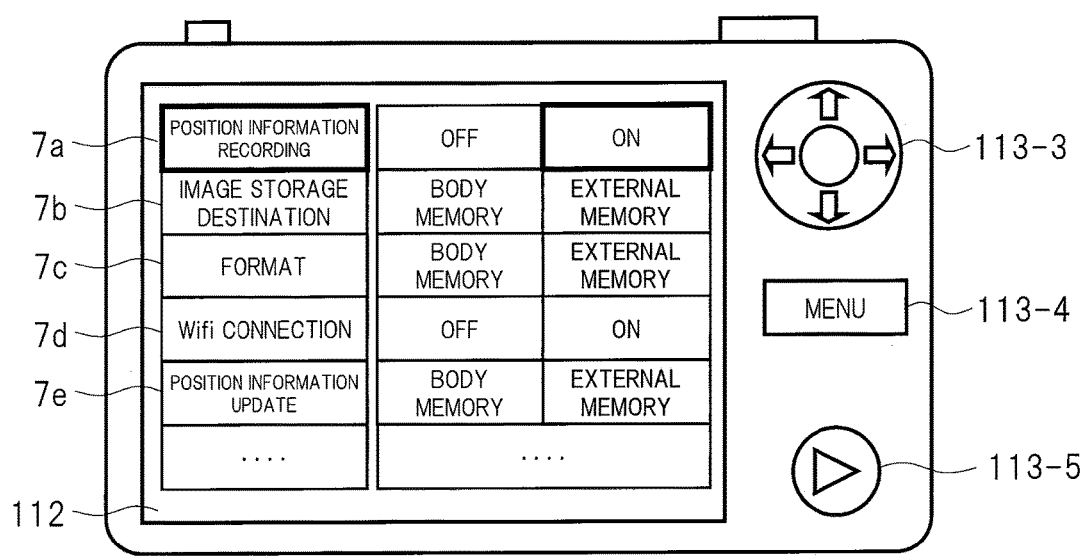
FIG. 17 is an explanatory diagram showing a display example of the menu display screen displayed on the display unit of the imaging apparatus of FIG. 1 in the menu operation processing of FIG. 16.

In the processing of step S901, if the menu button 113-4 is pressed (Yes), various kinds of setting/processing items of the imaging apparatus 1 are displayed on the display unit 112 as shown in FIG. 17 (step S902).

In a display example of a setting screen of FIG. 17, position information recording 7a, image storage destination 7b, format 7c, Wifi connection 7d, position information update 7e, and the like are displayed as setting items. The position information recording 7a sets whether or not the position information is recorded as additional information on metadata of image data. The image storage destination 7b sets whether the image storage destination is stored in the storage unit 104 of the imaging apparatus 1 or stored in the recording medium 106.

The format 7c is a format processing for initializing the storage unit 104 of the imaging apparatus 1 or the recording medium 106. The Wifi connection 7d is a processing for connecting with Wifi. The position information update 7e is a processing for updating the position information attendant on the image data recorded in the storage unit 104 of the imaging apparatus 1 or in the recording medium 106.

Subsequently, in FIG. 16, a selection/decision input of menu items is performed with a selection/decision operation button 113-3 (step S903), and a branch processing is performed depending on the selected item (step S904).

If the position information recording 7a is selected, position information setting is performed (step S905), and the process returns, again, to the processing of S902 that is the menu screen display processing.

If the storage destination 7b is selected, storage destination setting is performed (step S906), and the process returns to the processing of step S902 again. If the format 7c is selected, a format processing of the storage unit 104 of the imaging apparatus 1 or the recording medium 106 is performed (step S907), and the process returns to the processing of step S902.

If another setting item is selected, the setting/processing is performed depending on the selected item (step S908), and the process returns to the processing of S902. If "Wifi connection" is selected, a connection processing by Wifi is performed by the radio connection processing unit 1027 (step S910), and the process returns to the processing of step S602.

If the position information update 7e is selected, the storage unit 104 of the imaging apparatus 1 or the recording medium 106 is selected, a processing for updating the position information attendant on the image data recorded by the position information update processing unit 1028 is performed (step S911), and the process returns to the processing of step S902.

If "end" is selected by pressing the menu button 113-4, the menu operation processing for performing various kinds of settings/processings is ended.

By the above processing, various kinds of settings/processings of the imaging apparatus 1 are performed.

<Wifi Connection Processing>

Subsequently, the connection processing of the WiFi by the radio connection processing unit 1027 (step S910 of FIG. 16) will be described with reference to FIG. 18.

Figure 18:
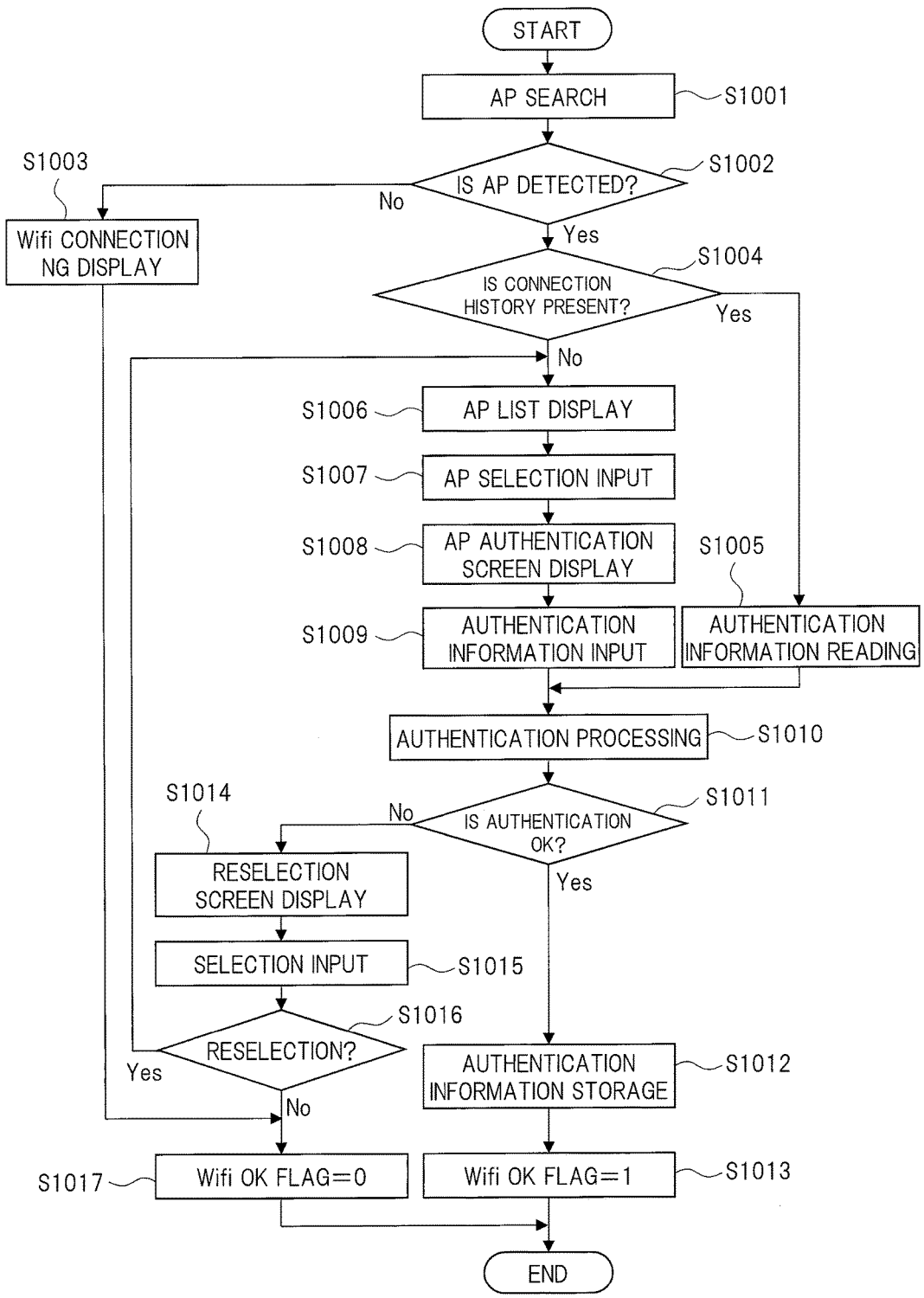
FIG. 18 is a flowchart showing an example of a connection processing of WiFi by a radio connection processing unit of FIG. 14.

FIG. 18 is a flowchart showing an example of the connection processing of the WiFi by the radio connection processing unit 1027 of FIG. 14.

First, a peripheral Wifi access point apparatus AP is searched, and the unique information such as a SSID, a MAC address, and the a reception level is acquired (step S1001). Then, a branch processing is performed depending on whether or not an access point apparatus AP is detected (step S1002).

In the processing of step S1002, if an access point apparatus AP is not detected (No), it is displayed on the display unit 112 that the Wifi connection cannot be made (step S1003).

In the processing of step S1002, if an access point apparatus AP is detected (Yes), whether or not there is a past Wifi connection history at the detected access point is checked by the information stored in the radio connection history information storage area 1043 of the storage unit 104, and a branch processing is performed (step S1004).

In the processing of step S1004, if there is a connection history (Yes), authentication information for connecting to an access point having a connection history is read from the radio connection history information storage area 1043 (step S1005), and an authentication processing is performed (step S1010).

In the processing of step S1004, if there is no connection history (No), a list of the detected access point's SSID and the like is displayed on the display unit 112 (step S1006). Then, when the user selects an access point to connect with Wifi by the selection/decision operation button 113-3 (step S1007), a screen for inputting authentication information, for example, information such as a password for connecting to the selected access point is displayed on the display unit 112 (step S1008).

The user inputs the authentication information by the selection/decision operation button 113-3 (step S1009). The authentication processing with the access point apparatus AP is performed by using the authentication information entered by the user or the authentication information read from the radio connection history information storage area 1043 (step S1010).

A branch processing is performed depending on whether or not authentication with the access point apparatus AP succeeds (step S1011). If the authentication is successful (Yes), the authentication information entered together with the SSID and the MAC address of the access point successful in the authentication is stored in the radio connection history information storage area 1043 (step S1012). Then, the flag (Wifi OK FLAG) indicating the Wifi connection condition is set to 1 (step S1013), and the processing is ended.

In addition, if the authentication fails (No), a selection input screen about whether to select the access point connected again or end the processing is displayed (step S1014). Subsequently, the user selectively inputs, by the selection/decision operation button 113-3, reselection of the access point or end of the processing (step S1015).

A branch processing is performed depending on the selection result of the user (step S1016). If the reselection of the access point is selected (Yes), the process returns to the processing of step S1006 that is the list display processing of access points.

In the processing of step S1016, if "end" is selected (No), the flag (Wifi OK FLAG) indicating the Wifi connection condition is set to 0 (step S1017), and the processing is ended.

By the above processing, the connection with the access point apparatus AP is made by Wifi, and data can be transmitted and received to and from the server apparatus SV through the network NT.

<Position information Update Processing>

Subsequently, an update processing of the position information update processing unit 1028 (step S911 of FIG. 16) will be described with reference to FIGS. 19 and 20.

Figure 19:
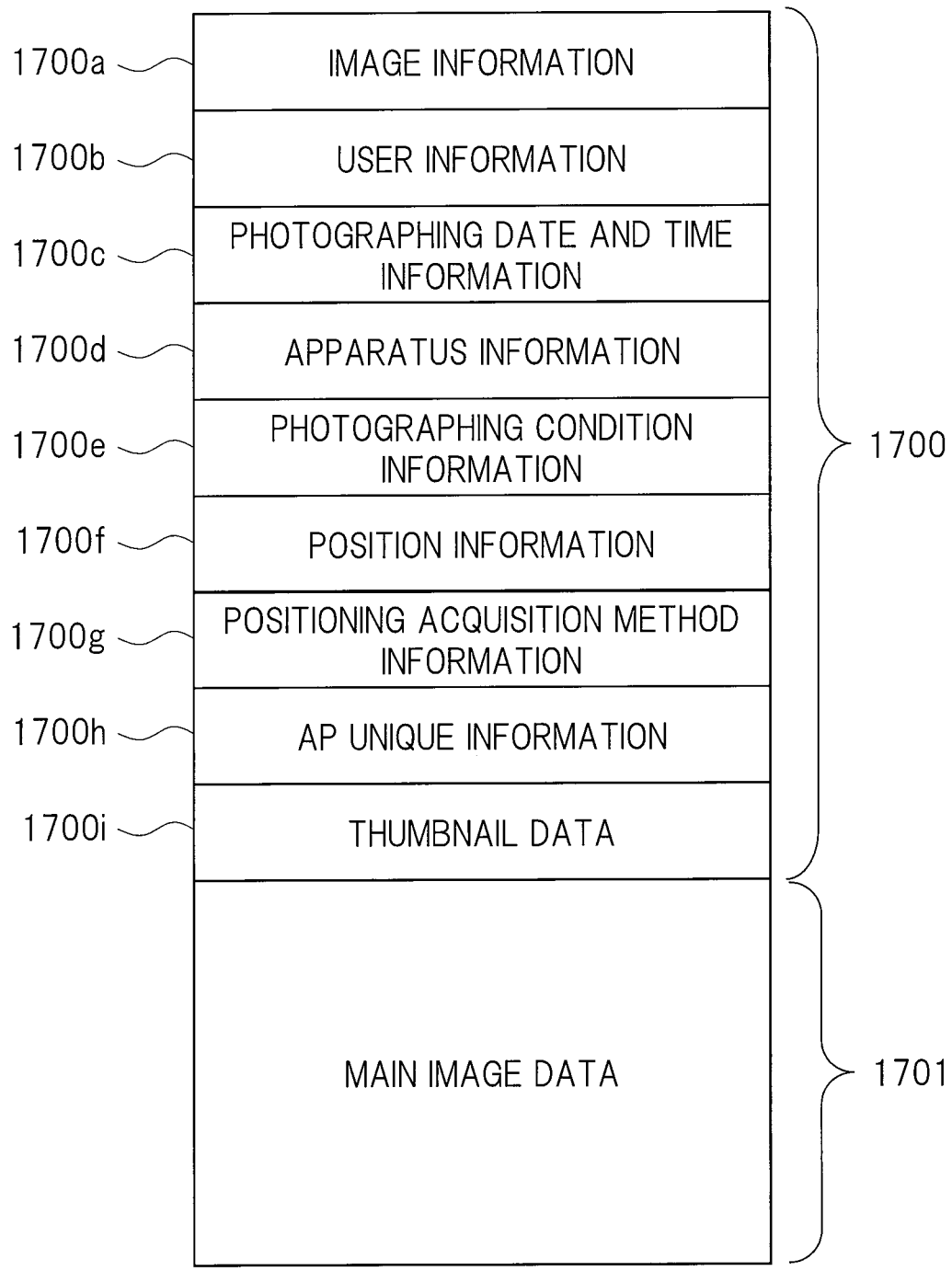
FIG. 19 is an explanatory diagram showing an example of a data configuration about an image file recorded in a storage unit or an external recording medium of FIG. 13.
Figure 20:
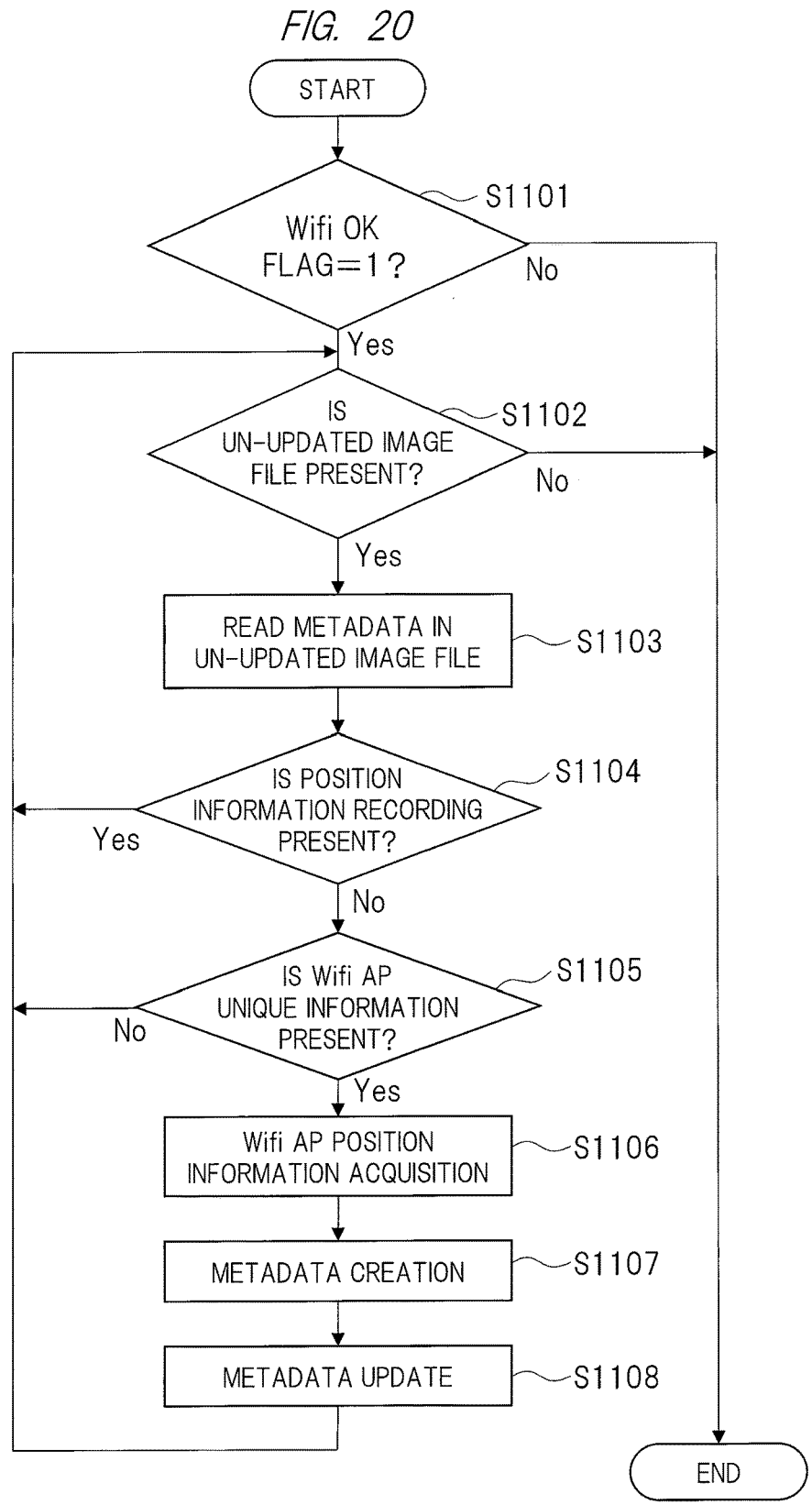
FIG. 20 is a flowchart showing an example of an update processing by a position information update processing unit of FIG. 14.

FIG. 19 is an explanatory diagram showing an example of a data configuration of an image file recorded in the storage unit 104 or the recording medium 106 in FIG. 13, and FIG. 20 is a flowchart showing an example of an update processing by the position information update processing unit 1028 of FIG. 14.

FIG. 19 shows an example of a data configuration of image files, in other words, a format. As shown in the figure, the image file roughly includes: metadata 1700 configured by data of attendant information; and main image data 1701.

The metadata 1700 includes image information 1700a, user information 1700b, date and time information 1700c, imaging apparatus information 1700d, photographing condition information 1700e, position information 1700f, position information acquisition method information 1700g, unique information 1700h, and thumbnail image data 1700i.

The image image information 1700a includes an image size, color information about the main image, and the like. The user information 1700b includes a user name and a comment. The date and time information 1700c is information such as the date and time of photographing.

The imaging apparatus information 1700d is information such as a manufacturer and a model number of the imaging apparatus 1. The photographing condition information 1700e is information on a photographing condition such as an exposure time and a shutter speed. The position information 1700f is position information acquired at a time of photographing.

The position information acquisition method information 1700g is information on a position information acquisition method by GPS or Wifi. The unique information 1700h is unique information on the Wifi access point acquired at the time of photographing. The thumbnail image data 1700i is thumbnail image data of images.

Subsequently, the update processing of the position information update processing unit 1028 will be described.

In FIG. 20, a branch processing is performed by a flag (Wifi OK FLAG) indicating a Wifi connection condition (step S1101). If the Wifi connection condition flag (Wifi OK FLAG)=0 is set (No), the processing is ended.

In the processing of step S1101, if the Wifi connection condition flag (Wifi OK FLAG)=1 is set (Yes), a branch processing depending on whether or not there is a file in which an update processing of position information is not performed is performed in the image file recorded in the storage unit 104 or the recording medium 106 selected by a menu processing (step S1102).

If there is no file in which the update processing of the position information is not performed (No), the processing is ended. In addition, if there is a file in which the update processing of the position information is not performed (Yes), the metadata 1700 of the image file in which the update processing is not performed is read (step S1103).

A branch processing is performed depending on whether or not the position information 1700f is recorded in the read metadata 1700 (step S1104). If the position information 1700f is recorded (Yes), the process returns to the processing of step S1102.

If the position information 1700f is not recorded (No), a branch processing is performed depending on whether or not the unique information 1700h such as the SSID and the MAC address of the Wifi access point is recorded in the read metadata 1700 (step S1105). If the unique information 1700h is not recorded (No), the process returns to the processing of step S1102.

In the processing of step S1105, if the unique information 1700h is recorded (Yes), the position information on the access point apparatus AP is acquired (step S1106). Through acquisition of such position information, the position information on the access point apparatus AP is acquired from the server apparatus SV by transmitting, to the server apparatus SV, unique information such as the SSID and the MAC address of the access point apparatus AP recorded in the unique information 1700h.

Here, the information on the reception level of the Wifi radio wave acquired in searching the access point may also be recorded as unique information, and the position information may be corrected. Thus, the accuracy of the position information obtained by photographing the image can be further improved.

Furthermore, the position information may be corrected from position information on a plurality of access point apparatuses. In this case, the unique information and the reception level information on the plurality of access point apparatuses acquired in searching the access point is recorded; the unique information on the plurality of access point apparatuses is transmitted to the server apparatus SV so that the position information on the plurality of access point apparatuses AP is acquired; and the position information is corrected by using the reception level information acquired from the plurality of access point apparatuses AP. Also by this, the accuracy of the position information obtained by photographing the image can be improved.

Subsequently, in FIG. 20, metadata 1700 to which the acquired position information is added is created (step S1107). Then, the metadata of the image file read in the processing of step S1103 is updated to the metadata, to which the position information created in the processing in step S1107 is added, and is recorded. The process returns to the processing of step S1102 (step S1108).

By the above processing, the position information can be acquired based on the unique information 1700h on the access point apparatus AP recorded as metadata, and the image file can be updated to an image file including the metadata to which the position information is added.

By the processing, even if photographing is performed at a place where GPS signals cannot be received and Wifi connection cannot be performed, for example, in a building or the like, the generation of image data that has erroneous position information or in which position information is not acquired can be reduced.

<Image Recording Processing>

Figure 21:
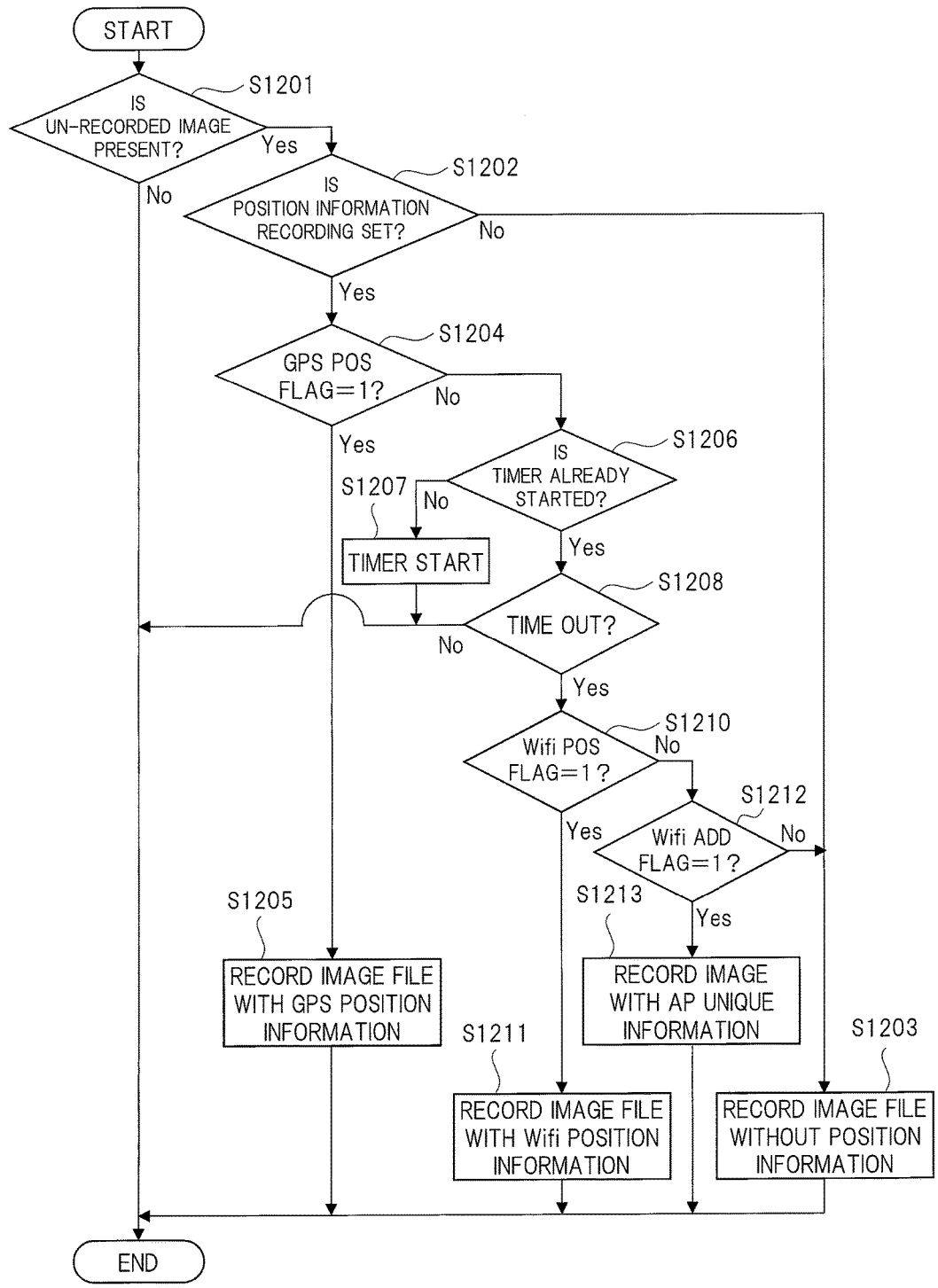
FIG. 21 is a flowchart showing an example of image recording processing by an image recording unit of FIG. 14.

FIG. 21 is a flowchart showing an example of an image recording processing by the image recording unit 1024 of FIG. 14.

First, since processings in steps S1201 to S1204 of FIG. 21 is the same as the processings in steps S601 to S604 of FIG. 10 of the first embodiment, their descriptions will be omitted.

Subsequently, in the processing of step S1204, if the position information acquisition condition flag (GPS POS FLAG)=1 is set (Yes), the image file is recorded (step S1205), and the image recording processing is ended.

The image file includes image data and metadata. The metadata includes: position information acquired by GPS; and position information acquisition method information indicating that the position information by the GPS is acquired. The image file is recorded in the storage unit 104 or the recording medium 106 set as a storage destination.

In the processing of step S1204, if the position information acquisition condition flag (GPS POS FLAG)=0 is set (No), a branch processing is performed depending on whether or not the timer is started (step S1206).

If the timer is not started (No), the timer set for a predetermined time is started (step S1207), and the image recording processing is ended. Time set by the timer is determined in consideration of a period from a time of turning on the power to a time of making it possible to acquire the position information by GPS, and may be the time set in advance at a time of shipment of the imaging apparatus 1 or may be set by the user.

In addition, if the timer is started (Yes), a branch processing is performed depending on whether or not the timer times out (step S1208). If the timer does not time out (No), the image recording processing is ended.

In the processing of step S1208, if the timer times out (Yes), a branch processing is performed by the flag (Wifi POS FLAG) indicating the acquisition condition of the position information by Wifi (step S1210).

In the processing of step S1210, if the Wifi position information acquisition condition flag (Wifi POS FLAG) is 1 (Yes), the image data to which position information and position information acquisition method information are added as metadata is recorded as an image file (step S1211), and the image recording processing is ended.

The position information is information acquired by the unique information on the Wifi access point through the position information acquisition unit 1022. The position information acquisition method information is information indicating that position information is acquired by Wifi. The image file stores the image data in the storage unit 104 or the recording medium 106 set as a storage destination.

In the processing of step S1210, if the Wifi position information acquisition condition flag (Wifi POS FLAG) is 0 (No), a branch processing is performed depending on the flag (Wifi ADD FLAG) indicating the acquisition condition of the Wifi access point unique information (step S1212).

If the Wifi access point unique information acquisition condition flag (Wifi ADD FLAG) is 0 (No), the image file is recorded as an image file in which the position information 1700f and the unique information 1700h on the access point are not added as metadata in the storage unit 104 or the recording medium 106 set as a storage destination (step S1203), and the image recording processing is ended.

In addition, in the processing of step S1212, if the access point unique information acquisition condition flag (Wifi ADD FLAG) is 1 (Yes), the image file is recorded as an image file in which the unique information on the access point acquired by the position information acquisition unit 1022 is added as metadata (step S1213), and the image recording processing is ended. The image file is recorded in the storage unit 104 or the recording medium 106 set as a storage destination.

It should be noted that the reception level, the frequency, the time stamp of the acquisition date and time, and the like about radio waves acquired in searching the access point may be recorded as the Wifi access point unique information together with the SSID and the MAC address of the access point apparatus AP.

In addition, unique information on a plurality of access point apparatuses acquired in searching an access point apparatus may be recorded. As the unique information on the access point apparatus to be recorded, recorded is unique information on a predetermined number or less (for example, three or less) of access point apparatuses, for example, in descending order of radio wave reception levels. By using radio wave reception level information on Wifi to correct the position information, the accuracy of the position information obtained by photographing the image can be improved.

As described above, by providing the radio communication unit 120 to the imaging apparatus 1, the position information can be acquired from the unique information on the Wifi access point apparatus AP.

In an environment such as an interior, there is a case where the GPS signal cannot be received or the position information acquisition by GPS signals takes time even if the signal can be received. However, the unique information on the access point apparatus AP can be acquired in a short time.

In addition, even if no access point apparatus AP capable of Wifi-connection at the time of photographing is around its photographing place, the unique information on the access point apparatus AP is recorded as metadata, so that the position information can be updated to the image file added as metadata by performing an update processing of the position information at a Wifi-connectable place such as home.

Incidentally, in the image recording processing of FIG. 21, the timer is started when the position information by GPS signals cannot be acquired (GPS POS FLAG=0). However, the timer may not be started if the position information by the unique information on the Wifi access point can be acquired (Wifi POS FLAG=1), and the image data to which the position information and the position information acquisition method information acquired by the unique information on the Wifi access point are added as metadata may be recorded as an image file.

In this case, if the position information by GPS signals cannot be acquired (GPS POS FLAG=0) and if the position information based on the unique information on the Wifi access point cannot be acquired (Wifi POS FLAG=0), the timer is started. If the position information by GPS signals or the position information based on the unique information on the Wifi access point can be acquired within a predetermined time, the image data to which the acquired position information and position information acquisition method information are added as metadata is recorded as an image file.

In addition, if neither the position information based on the GPS signals nor the position information based on the unique information on the Wifi access point can be acquired within a predetermined time, and if the unique information on the Wifi access point can be acquired (Wifi ADD FLAG=1), recording is performed as an image file to which the unique information on the access point is added as metadata. If the unique information on the Wifi access point cannot be acquired (Wifi ADD FLAG=0), recording is performed as an image file to which the position information and the unique information on the access point are not added.

(Third Embodiment)

In the present third embodiment, when there is image data in which position information is not acquired during image reproduction, a technique for selecting the image data and updating the position information will be described.

Figure 22:
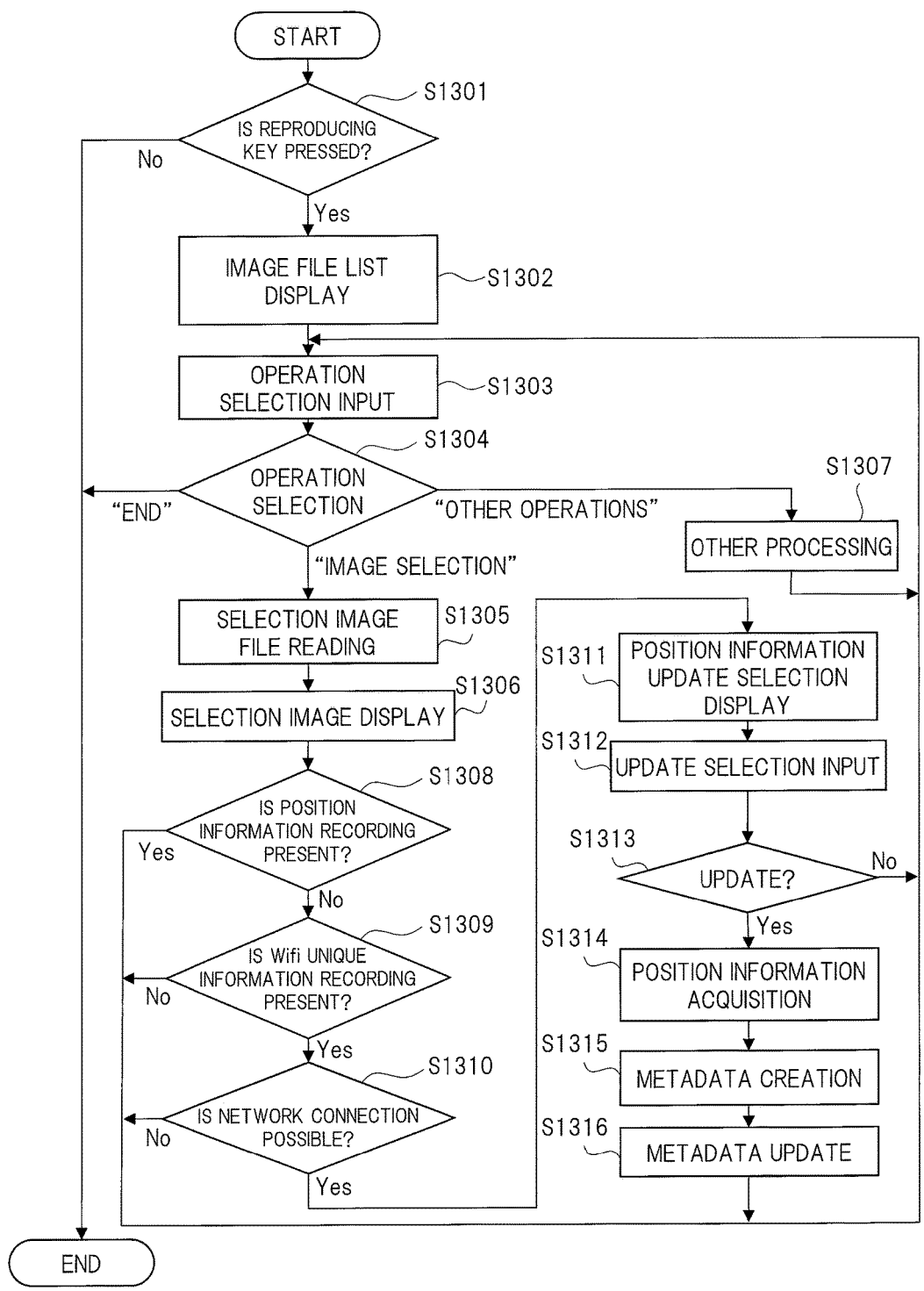
FIG. 22 is a flowchart showing an example of an image reproducing processing by an image reproducing unit according to the present third embodiment.

FIG. 22 is a flowchart showing an example of an image reproducing processing by an image reproducing unit according to the present third embodiment.

In FIG. 22, since the processings in steps S1301 to S1307 is the same as the processings in steps S701 to S707 of FIG. 11 of the second embodiment, their descriptions will be omitted.

In the processing of step S1306, when an image is displayed on the display unit 112 of FIG. 3, whether or not the position information is recorded in the metadata of the displayed image is determined (step S1308).

If the position information is recorded, the process returns to the processing in step S1303. If the position information is not recorded, whether or not the unique information on the Wifi access point is recorded in the metadata is determined (step S1309).

If the unique information on the Wifi access point is recorded in the metadata, whether or not the radio communication unit 120 of FIG. 13 is connectable to the network NT is determined (step S1310).

If the unique information on the Wifi access point is not recorded in the metadata in the processing of step S1309 and if the radio communication unit 120 cannot be connected to the network NT in the processing of step S1310, the process returns to the processing in step S1303.

In addition, if the radio communication unit 120 is connectable to the network NT in the processing of step S1310, a menu for selecting whether or not the position information on the displayed image can be updated and the position information on the image is updated is displayed (step S1311).

The user selects the menu displayed on the display unit 112 from the selection/decision operation button 113-3 or the like of FIG. 3 (step S1312), and performs a branch processing depending on a selection result (step S1313). If a menu for not updating the position information is selected (No), the process returns to the processing of step S1303.

If a menu for updating the position information is selected (Yes), position information is acquired (step S1314). In this processing, the position information on the access point apparatus Ap detected in photographing the image, or the position information corrected based on the reception level of the Wifi radio waves is acquired by sending, to the server apparatus SV from the radio communication unit 120, the unique information on the Wifi access point that is recorded as the metadata of the displayed image.

Then, the metadata to which the acquired position information is added is created (step S1315), and the metadata of the image file read in the processing of step S1305 is updated to the metadata to which the position information created in the processing of step S1315 is added, and the updated metadata is recorded (step S1316).

As described above, even if the position information is not acquired at the time of photographing, the position information can be acquired from the unique information on the Wifi access point recorded as the metadata of the image file at a time of reproduction , and can be updated to the metadata to which the position information is added.

(Fourth Embodiment)

<Outline>

As described with reference to, for example, FIG. 10, the imaging apparatus in the first embodiment temporarily stores the image data in the temporary storage area 1032 of the RAM 103 or the like shown in FIG. 2 before the image data is recorded in the recording medium. If the position information can be acquired within a predetermined time, the metadata including image information and the position information is recorded in the recording medium 106 of FIG. 1. In addition, if the position information image information cannot be acquired within the predetermined time, the image information together with the metadata not including the position information is recorded.

On the other hand, in the present fourth embodiment, if the position information is already acquired in recording the photographed image data, the image data is recorded in the recording medium 106 together with the metadata including the position information. If the position information cannot be acquired, the image data is recorded in the recording medium 106 together with the metadata not including position information.

Furthermore, if the position information can be acquired within a set time after the image data is recorded in the recording medium 106, the position information is added to the image data recorded in the recording medium 106, and the image data is updated.

When new imaging is started during a wait for acquisition of the position information in a temporary storage condition, a memory area needed for temporary storage cannot be used, and a load on an imaging processing increases. However, in a technique of the present fourth embodiment, there is the advantage that such a problem does not arise and newly photographing is performed at high speed.

<Image Recording Processing Example>

Figure 23:
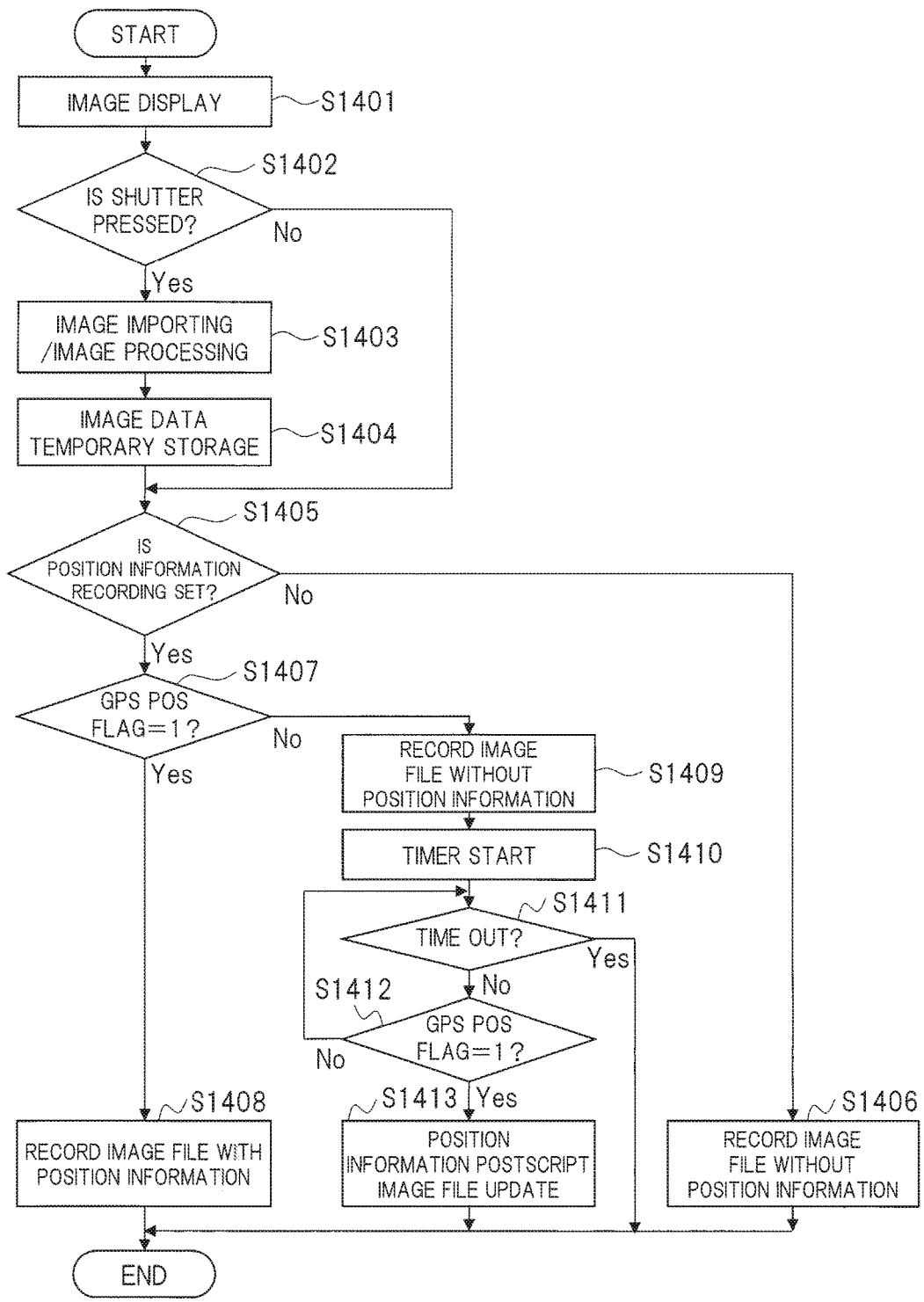
FIG. 23 is a flowchart showing an example of image recording processing according to a fourth embodiment.

FIG. 23 is a flowchart showing an example of an image recording processing according to the present fourth embodiment.

It should be noted that the configuration of the imaging apparatus 1 is the same as the configuration shown in FIG. 1 of the first embodiment or FIG. 13 of the second embodiment.

In addition, the processings in steps S1401 to S1404 of FIG. 23 are performed mainly by the photograph processing unit 1023, and the processings in steps S1405 to S1413 are processings performed mainly by the image recording unit 1024.

First, an image imaged by the imaging unit 110 is displayed on the display unit 112 (step S1401). A press of the shutter button 113-2 is checked, and a branch processing is performed (step S1402). If the shutter button 113-2 is not pressed (No), the process proceeds to the processing in step S1405.

If the shutter button 113-2 is pressed (Yes), data of an image imaged by the imaging unit 110 is imported, and the image signal processing unit 111 performs: an image processing such as white balance adjustment, exposure adjustment, and gamma correction; a processing for converting the data of the image into image data such as JPEG; and the like (step S1403).

Thereafter, the image data processed in the image signal processing unit 111 is stored in the image temporary storage area 1032 of the RAM 103 (step S1404). Incidentally, here, the image data is once stored temporarily in the RAM 103, but the image data may be recorded together with the metadata in the recording medium 106 or the storage unit 104 before continuously proceeding to the next processing.

It should be noted that the recording medium 106 may be: a flash memory etc. that can be attached so as to be attachable to and detachable from the imaging apparatus; or another recording medium that is connected through an interface such as an USB or a Wireless LAN.

Subsequently, a branch processing is performed depending on whether or not addition of the position information to the image data and record of the added image data are set (step S1405). In the processing of step S1405, if the position information is not set to be added to and recorded in the image data (No), the image data is recorded as an image file in which the position information is not added as metadata in the storage unit 104 or the recording medium 106 set as a storage destination (step S1406), and the image recording processing is ended. It should be noted that if the image file is already recorded in the processing of step S1404, a recording processing of the image file here is unnecessary.

In the processing of step S1405, if the position information is set to be added to and recorded in the image data (Yes), a branch processing is performed depending on the position information acquisition condition flag (GPS POS FLAG) (step S1407).

In the processing of step S1407, if the position information acquisition condition flag (GPS POS FLAG)=1 is set (Yes), the image data is recorded as an image file in which the acquired position information is added as metadata in the storage unit 104 or the recording medium 106 set as a storage destination (step S1408), and the image recording processing is ended.

Incidentally, if the image data and the metadata are already recorded in the storage unit 104 or the recording medium 106 in the processing of step S1404, only the updating processing of the metadata regarding the position information may be performed in the processing of step S1408.

Thus, stored can be the image file in which the position information acquired by the position information acquisition unit 1022 is added as information on a position where the image data is acquired.

If the position information acquisition condition flag (GPS POS FLAG)=0 is set in the processing of step S1407 (No), and if the position information is not set to be added to and recorded in the image data in the processing of step S1405 (No), the image data is recorded as an image file in which the position information is not added as metadata in the storage unit 104 or the recording medium 106 set as a storage destination (step S1409). Incidentally, in the processing of step S1404, if this processing is already executed, the processing of step S1409 is unnecessary.

Subsequently, the timer is started (step S1410). The time set by the timer is determined in consideration of a period from a time of turning on the power to a time of making it possible to acquire the position information by GPS. The time may be set in advance at the time of shipment of the imaging apparatus 1, or may be set by the user.

A branch processing is performed depending on whether or not the timer started in the processing of step S1410 times out (step S1411). If the timer times out (Yes), the image recording processing is ended.

In addition, if the timer does not time out (No), a branch processing is performed based on the position information acquisition condition flag (GPS POS FLAG) (step S1412).

In the processing of step S1412, if the position information acquisition condition flag (GPS POS FLAG)=1 is set (Yes), the acquired position information is postscribed in the storage unit 104 or the recording medium 106, and thereby the image data is updated into the metadata of the image data stored in the processing of step S1409 (step S1413).

As described above, the image recording processing is ended.

Thus, in the image recording processing example shown in FIG. 23, even when the position information is not acquired at the time of the imaging recording, the image data is recorded in the recording medium 106 together with the metadata having no position information without the temporary storage and the wait for the acquisition of the position information.

Then, if the position information is not acquired after the recording, the timer is started, the image file that has been already recorded in enabling the acquisition of the position information within a predetermined time is updated, and the position information is postscribed.

As described above, since the image data is not temporarily stored until the position information acquisition, the memory (RAM) for temporary storage is released even when newly imaging is performed during the position information acquisition. This allows a decrease in imaging processing speed to be reduced.

Incidentally, in the present fourth embodiment, if a new imaging processing is executed while the timer is started to acquire the position information, a period of time until time-out may be extended in consideration of the time required for an imaging processing.

(Fifth Embodiment)
<Outline>

In the first to fourth embodiments described so far, the position information to be added to the image data is automatically added. The present fifth embodiment will describe a technique that enables the user to manually add position information or to change the position information mistakenly added for some cause.

For example, on the menu display screen shown in FIG. 8 of the first embodiment, the image file is recorded with the position information recording 7a turned OFF. But, if the position information is desired to be added to the image file later, the position information can be updated by using the technique according to the present fifth embodiment.

<Example of Menu Display Screen>

First, the menu display screen shown in FIG. 8 will be described.

On the menu display screen shown in FIG. 8, the position information editing 7f is displayed below the format 7c.

This position information editing 7f is a menu for selecting "addition" or "editing" of position information, and a position information editing processing is performed based on this menu. If "addition" of the position information editing 7f is selected, the menu screen can be shifted to a menu screen for adding position information to a recorded image in which position information is not recorded. This "addition" serves as a command for adding position information.

In addition, if "editing" of the position information editing 7f is selected, the menu screen can be shifted to a menu screen for correcting the position information added to the recorded image.

It should be noted that as another method of displaying the position information editing 7d on this selection menu screen, a method of displaying one item of selectable menus displayed in pressing the menu button 113-4 may be adopted.

<Processing Example of Position information Editing Processing>

Subsequently, the position information editing processing will be described with reference to FIG. 24.

Figure 24:
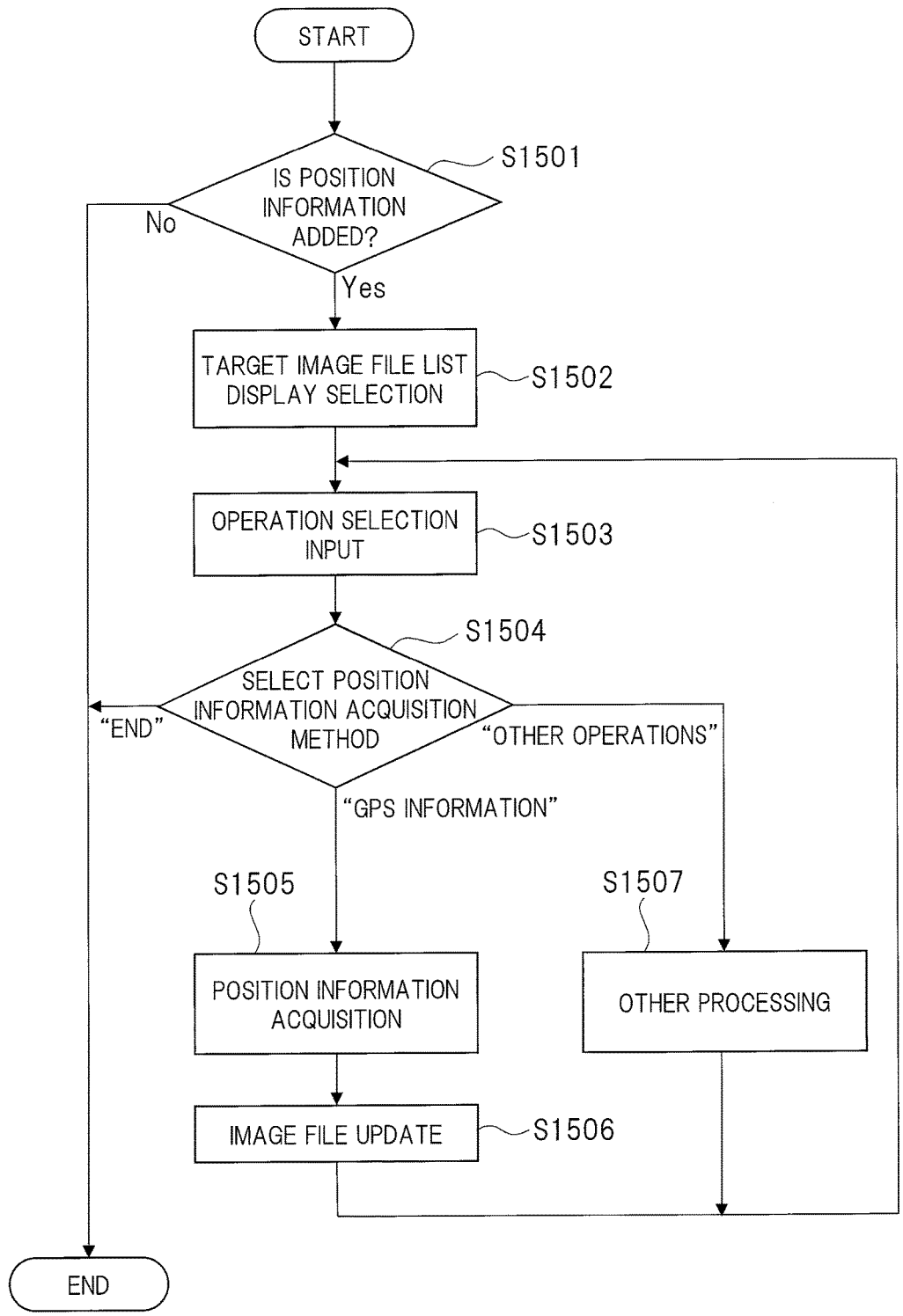
FIG. 24 is a flowchart showing an example of a position information editing processing according to a fifth embodiment.

FIG. 24 is a flowchart showing an example of the position information editing processing according to the present fifth embodiment. FIG. 24 is a flowchart for describing an operation in selecting "addition" in the position information editing 7d. The processings in FIG. 24 are processings mainly performed by the image reproducing unit 1025.

First, on the menu display screen shown in FIG. 8, if "addition" of the position information editing 7d is selected (Yes in step S1501), metadata such as a file name, photographing date and time, and a thumbnail image is read from the image file stored in the storage unit 104 or the recording medium 106 set as a storage destination, and a thumbnail list of the image file to which position information is not added is displayed (step S1502). Here, the user selects an image to which position information is desired to be added. The display of the thumbnail list only has to be performed similarly to the example shown in FIG. 12.

Thereafter, an input for selecting an image is performed similarly to the example shown in FIG. 12 (step S1503), and how the user adds position information to the selected image is selected (step S1504).

Figure 25:
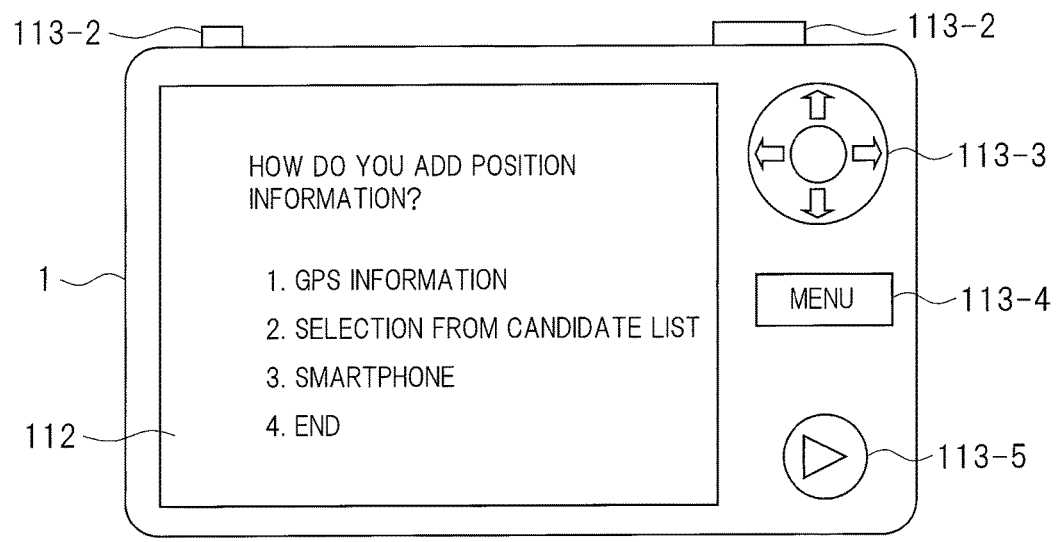
FIG. 25 is an explanatory diagram showing an example of a position information addition selection screen displayed in a processing about step S1504 of FIG. 24.

FIG. 25 is an explanatory diagram showing an example of the position information addition selection screen displayed in the processing about step S1504 of FIG. 24.

In the processing of step S1504, the selection screen shown in FIG. 25 is displayed. In an example of FIG. 25, there are "1. GPS Information", "2. Selection from Candidate List", "3. Smartphone", and "4. End" as the additions of position information. The user selects anyone of them by the selection/decision operation button 113-3.

The "1. GPS information" adds position information newly received by the GPS receiver unit 115 of a body of the imaging apparatus 1. The "2. Selection from Candidate List" is selected from a list of the past position information received by the imaging apparatus 1.

The "3. Smartphone" does not use the position information received by the GPS receiver unit 115 of the imaging apparatus 1, but acquires position information from an external communication device, which has an acquisition function of GPS information, such as a smartphone connected to the imaging apparatus 1 and capable of transmission and reception of information, and adds the position information thereto. In addition, the "4. End" is an option of the ending the processings without performing them.

In FIG. 24, when "1. GPS Information" is selected ("GPS Information") on the screen of FIG. 25, new position information is acquired by the GPS receiver unit 115 (step S1505). This position information acquisition processing is the same as the position information acquisition processing of FIG. 23. Specifically, this position information acquisition processing is the same as the processings in steps S1410 to S1412 of FIG. 23.

Then, the acquired position information is postscribed as the position information of the metadata in the target image file recorded in the storage unit 104 or the recording medium 106, and the image file is updated by the same processing as the processing in S1413 of FIG. 23 (step S1506).

In addition, in the processing of step S1504, if other processing as a processing other than "1. GPS Information" of FIG. 25, that is, "2. Selection from Candidate List" or "3. Smartphone" of FIG. 25 is selected, the corresponding processing thereto is executed (step S1507). Also in this case, the corresponding processing is the same as the processings in steps S1505 and S1506 except that the acquiring method of position information is different.

<Addition Example of Position information>

Subsequently, a technique of adding position information based on "2. Selection from Candidate List" and "3. Smartphone" of FIG. 25 will be described.

The "2. Selection from Candidate List" is a technique of selecting any from the list of the past position information received by the imaging apparatus 1. For example, a list of names of cities and towns, names of parks, buildings, or the like is displayed to select them, and therefore the GPS information associated with these names is automatically acquired.

Information for associating these names with the GPS only has to be stored in advance, for example, in the setting information storage area 1041 and the like of the storage unit 104. According to this technique, such an operation as to add the same GPS information to a series of images photographed in the same place can be easily performed.

The "3. Smartphone" is a technique that does not use the position information received by the GPS receiver unit 115 of the imaging apparatus 1, but acquires position information from an external communication device, which has an acquisition function of GPS information, such as a smartphone connected to the imaging apparatus 1 and capable of transmission and reception of information, and adds the position information thereto.

In the following, a case where GPS information is acquired by using a smartphone as an external communication device will be described.

In order for the imaging apparatus 1 to acquire GPS information from the smartphone, it is necessary to connect the smartphone with the imaging apparatus 1 in advance so that the smartphone and the imaging apparatus 1 can communicate with each other.

<Configuration Example of Imaging Apparatus>

Here, a configuration example of an imaging apparatus for acquiring GPS information from a smartphone will be described with reference to FIG. 26.

Figure 26:
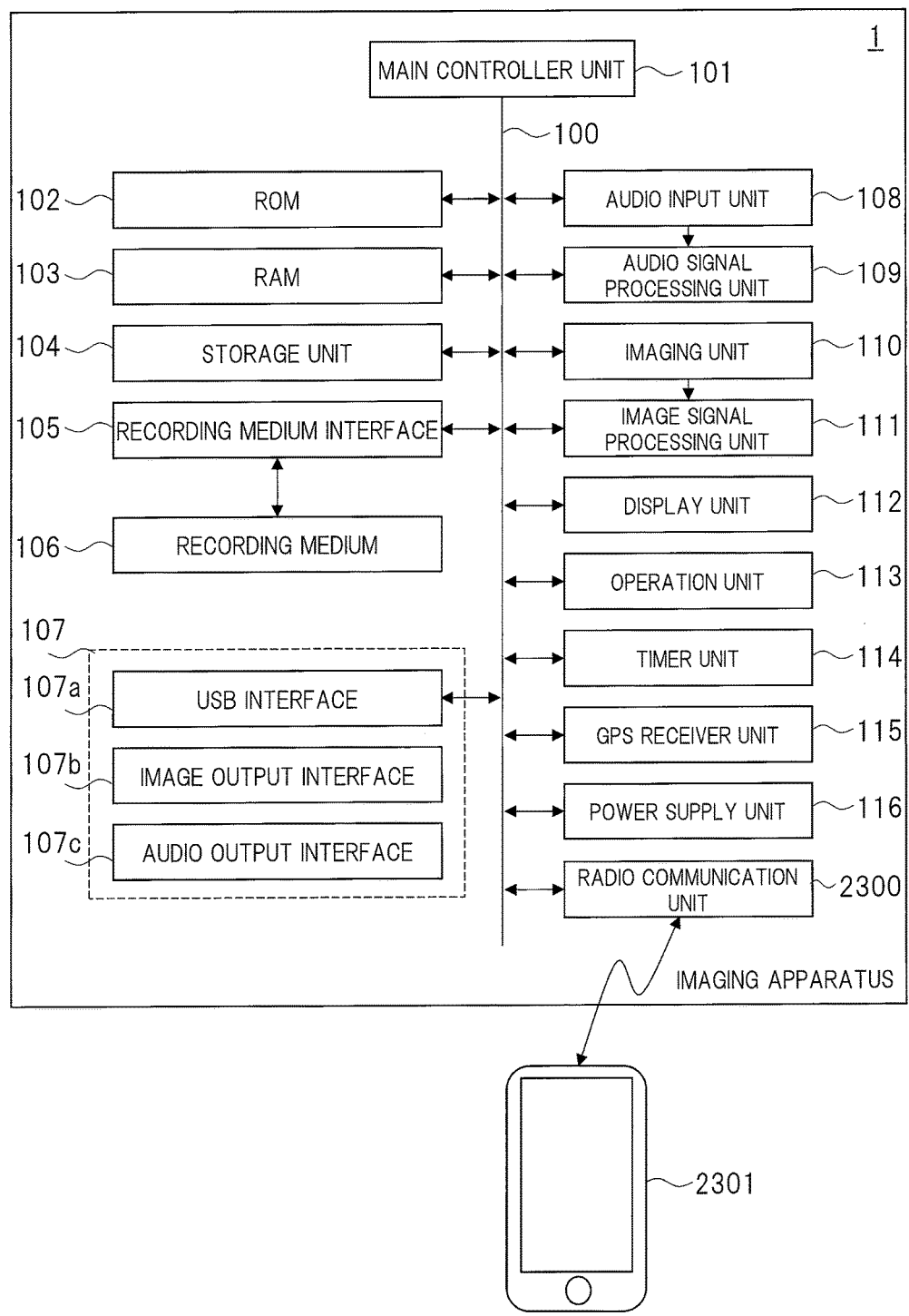
FIG. 26 is an explanatory diagram showing an example of an imaging apparatus that executes a position information editing processing of FIG. 24.

FIG. 26 is an explanatory diagram showing an example of a photographing apparatus that executes a position information editing processing of FIG. 24.

An imaging apparatus 1 in FIG. 26 differs from the imaging apparatus 1 in FIG. 13 of the second embodiment in that a radio communication unit 2300 is provided in place of the radio communication unit 120.

The radio communication unit 2300 is a radio communication unit having a Wi-Fi access point function. A smartphone 2301 having a Wi-Fi communication function connects to the radio communication unit 2300 of the imaging apparatus 1, and thereby various kinds of data communication become possible between the imaging apparatus 1 and the smartphone 2301.

The smartphone 2301 serving as an external communication device has a reception function of GPS information, and can transmit GPS information to the imaging apparatus 1 by installing dedicated application software. Incidentally, since the other configuration of the imaging apparatus 1 of FIG. 26 is the same as that of the imaging apparatus 1 of FIG. 13 as described above, a description(s) of an operation(s) of the other parts will be omitted.

A technique of acquiring GPS information from outside through the smartphone 2301 can turn off the GPS reception function of the imaging apparatus 1. This is advantageous to lowering of the power consumption of the imaging apparatus 1.

In addition, when a level of the communication function of the smartphone is higher than that of the imaging apparatus 1, high-accuracy GPS information can be obtained at higher speed. Furthermore, there is the advantage that GPS information can be acquired even when an imaging apparatus 1 having no GPS information acquisition function is used.

As described above, even when position information cannot be acquired at the time of photographing, position information can be manually added by the user, or position information mistakenly added for some cause can be changed.

Incidentally, in the position information editing 7f of FIG. 8, an image file to be targeted in selecting "Addition" is a file to which position information is not added, whereas an operation in selecting "Change" targets a file to which the position information has already been added.

In a case of "Addition", during the processing in step S1502 of FIG. 24 that is the targeted image file list display selection, the file to which position information is not added is displayed. On the other hand, in a case of "Change", the image file to which the position information has been already added is displayed in the same list display of targeted image files.

The other processing is almost the same processing except that the "Change" rewrites GPS information while the "Addition" newly adds GPS information, so that their detailed descriptions will be omitted.

As described above, the present fifth embodiment is configured so that the metadata related to the position information is not recorded when the GPS information cannot be acquired. However, when the GPS information acquired last time is automatically added and there arises a discrepancy between the added GPS information and an actual photographing location, the position information may be rewritten by the technique shown in the fifth embodiment.

In addition, when the time-out occurs at the time of acquisition of GPS information and position information cannot be recorded, a menu for inquiring whether or not to add position information to these images may be automatically displayed.

Although the inventions made by the present inventors are specifically described based on the above embodiments, it goes without saying that the present inventions are not limited to the above embodiments, and various modifications can be made without departing from the gist thereof.

In the first to fifth embodiments, the digital camera has been described as an example of the imaging apparatus, but the imaging apparatus can also be implemented by a portable information terminal device such as a smartphone or a tablet having a photographing function.

In the portable information terminal device having the mobile communication function, position information can be acquired from unique information on a base station of a mobile communication network, and when position information by GPS signals cannot be acquired, the position information may be acquired by transmitting a base-station unique ID and a radio-wave reception intensity as unique information to the server apparatus SV connected to the network through the mobile communication network.

In addition, in overseas countries where it is not possible to connect to the network, for example, through the mobile communication network or the like, when photographing is performed inside a room or the like in which position information by GPS signals cannot be acquired, the unique information on the Wifi access point or the base station of the mobile communication network is recorded as metadata.

Thus, by performing an update processing of position information at a location connectable with the network, the updating can be performed to an image file to which position information is added as metadata.

Incidentally, in the second and third embodiments, the updating processing of the position information is performed in the imaging apparatus 1 of FIG. 1. However, an image file, in which unique information on the access point is recorded as metadata, may be stored in an information terminal device such as a personal computer connectable with the network, and the update processing of the position information may be performed in the information terminal device.

In addition, programs described in each processing example may be programs independent of each other, or a plurality of programs may constitute one application program. In addition, the order of executing each processing is interchanged, and then the interchanged processings may be executed.

Note that the present invention is not limited to the embodiments described above and includes various modification examples. For examples, the embodiments above have been described in detail so as to make the present invention easily understood, and the present invention is not always limited to the embodiment having all of the described constituent elements.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment maybe eliminated or replaced with another configuration.

REFERENCE SIGNS LIST 1 imaging apparatus
12 display unit
100 system bus
101 main controller unit
102 ROM
103 RAM
104 storage unit
105 recording medium interface
106 recording medium
107 external interface
108 audio input unit
109 audio signal processing unit
110 imaging unit
111 image signal processing unit
112 display unit
113 operation unit
114 timer unit
115 GPS receiver unit
116 power supply unit
120 radio communication unit
2300 radio communication unit
2301 smartphone
AP access point apparatus
SV server apparatus

The invention claimed is:

1. An imaging apparatus comprising:
a controller programmed to acquire image data from an optical image;
a first memory configured to temporarily store the image data;
a signal receiver configured to acquire a position calculation signal;
a storage medium configured to store the image data from the first memory and metadata; and
a display unit,
wherein the controller is programmed to acquire position information corresponding to a position of the acquired image data from the position calculation signal received by the signal receiver,
wherein the controller is programmed to operate in a first control mode to:
when the signal receiver cannot acquire the position calculation signal, execute a position information acquisition process to acquire the position information within a preset time,
when the position information is acquired within the preset time, record, the temporarily stored image data and the metadata to which the acquired position information is added in the storage medium, and
when the position information is not acquired within the preset time, record the temporarily stored image data and the metadata without position information in the storage medium, and
wherein the controller is programmed to operate in a second control mode to:
add position information to the metadata of the image data which was previously recorded in the storage medium without position information, and
wherein, when the second control mode is selected, the controller is programmed to selectively extract one or more thumbnails of the image data previously recorded in the storage medium in which the metadata was stored without position information, and to display a list of the extracted one or more thumbnails on the display unit in a selectable state.

2. The imaging apparatus according to claim 1,
wherein the position calculation signal received by the signal receiver is a GPS signal, and
wherein the controller is programmed to calculate the position information from the GPS signal.

3. The imaging apparatus according to claim 2, further comprising:
a radio interface configured to acquire unique information of a wireless access point and connectable with a server connected through a communication line,
wherein, when the signal receiver cannot receive the GPS signal, the controller is programmed to acquire the position information based on the unique information.

4. The imaging apparatus according to claim 3,
wherein the unique information is an SSID and a MAC address of the wireless access point, and the position information is acquired by inquiring to the server about the position information data tied to the SSID and the MAC address.

5. The imaging apparatus according to claim 3,
wherein, when the radio interface cannot inquire to the server, the controller is programmed to record, in the storage medium, the temporarily stored image data and the metadata to which the unique information acquired from the wireless access point is added.

6. The imaging apparatus according to claim 4,
wherein, when the radio interface accesses a plurality of the wireless access points, the controller is programmed to acquire, as the unique information, reception levels of radio waves of the plurality of the wireless access points and correct the position information from the reception levels of the radio waves of the plurality of the wireless access points.

7. An image recording method by an imaging apparatus capable of recording image data acquired from an optical image and metadata, the image recording method comprising:
temporarily storing the image data in a first memory;
acquiring a position calculation signal;
acquiring position information corresponding to a position where the image data is acquired from the position calculation signal; and
recording the temporarily stored image data and the metadata in a storage medium,
wherein a first control mode includes:
when the position calculation signal cannot be acquired, executinq a position information acquisition process for acquiring the position information within a preset time,
when the position information is acquired within the preset time, recording the temporarily stored image data and the metadata to which the acquired position information is added in the storage medium, and
when the position information is not acquired within the preset time, recording the temporarily stored image data and the metadata without position information in the storage medium,
wherein a second control mode includes adding position information to the metadata of the image data which was previously recorded in the storage medium without position information, and
wherein, when the second control mode is selected, selectively extracting one or more thumbnails of the image data previously recorded in the storage medium without position information, and displaying a list of the extracted one or more thumbnails in a selectable state.

8. The image recording method according to claim 7, wherein the position calculation signal is a GPS signal, and
wherein the position information is calculated from the GPS signal.

9. The image recording method according to claim 8, further comprising:
acquiring unique information of a wireless access point; and
inquiring to a server connected through a communication line about the unique information to acquire the position information,
wherein, when the GPS signal cannot be acquired, the temporarily stored image data and the metadata to which the position information acquired by inquiring of the server is added are recorded in the storage medium.

10. The image recording method according to claim 9, wherein the unique information acquired from the wireless access point is an SSID and a MAC address of the wireless access point.

11. The image recording method according to claim 9, wherein, when the server cannot be inquired of, the temporarily stored image data and the metadata to which the unique information acquired from the wireless access point is added are recorded in the storage medium.

12. The image recording method according to claim 10, wherein, when accessing a plurality of the wireless access points, the unique information includes reception levels of radio waves of the plurality of the wireless access points, and
wherein the position information is corrected from the reception levels of the radio waves of the plurality of the wireless access points.

13. The imaging apparatus according to claim 1, further comprising:
a radio interface configured to perform radio communication with a device external to the imaging apparatus,
wherein the controller is programmed to operate in the second control mode to further display, on the display unit, a screen to select any of using newly acquired position information, using past position information, or using position information acquired via the radio interface as the position information which is added to the metadata.

14. The imaging apparatus according to claim 1, wherein the controller is programmed to operate in a third control mode to change the position information added to the metadata of the image data recorded in the storage medium, and
wherein, when the third control mode is selected, the controller is programmed to selectively extract one or more thumbnails of the image data previously recorded in the storage medium in which the metadata was added, and to display a list of the extracted one or more thumbnails on the display unit in a selectable state.

15. The image recording method according to claim 7, further comprising:
performing radio communication with a device external to the imaging apparatus,
wherein the second control mode further includes displaying a screen to select any of using newly acquired position information, using past position information, or using position information acquired via the radio communication as the position information which is added to the metadata.

16. The image recording method according to claim 7, wherein a third control mode includes changing the position information added to the metadata of the image data recorded in the storage medium, and
wherein, when the third control mode is selected, selectively extracting one or more thumbnails of the image data previously recorded in the storage medium in which the metadata was added, and displaying a list of the extracted one or more thumbnails in a selectable state.

* * * * *